United States Patent
Sundararajan et al.

(10) Patent No.: US 11,309,999 B2
(45) Date of Patent: Apr. 19, 2022

(54) REPETITION TECHNIQUES FOR AUTONOMOUS UPLINK TRANSMISSIONS

(71) Applicant: QUALCOMM Incorporated, San Diego, CA (US)

(72) Inventors: Jay Kumar Sundararajan, San Diego, CA (US); Jing Jiang, San Diego, CA (US); Wanshi Chen, San Diego, CA (US); Wei Yang, San Diego, CA (US); Seyedkianoush Hosseini, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/524,866

(22) Filed: Jul. 29, 2019

(65) Prior Publication Data

US 2020/0044793 A1     Feb. 6, 2020

Related U.S. Application Data

(60) Provisional application No. 62/712,886, filed on Jul. 31, 2018.

(51) Int. Cl.
*H04L 1/18* (2006.01)
*H04L 5/00* (2006.01)
(Continued)

(52) U.S. Cl.
CPC .......... *H04L 1/1887* (2013.01); *H04L 5/0007* (2013.01); *H04W 72/1268* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 2016/0219627 A1* | 7/2016 | Au | H04W 74/0841 |
| 2019/0230691 A1* | 7/2019 | Cao | H04L 5/0044 |
| 2020/0389264 A1* | 12/2020 | Hedayat | H04L 1/1896 |

FOREIGN PATENT DOCUMENTS

WO    WO-2016073591 A1    5/2016

OTHER PUBLICATIONS

International Search Report and Written Opinion—PCT/US2019/044151—ISA/EPO—Oct. 22, 2019.
(Continued)

*Primary Examiner* — Alex Skripnikov
(74) *Attorney, Agent, or Firm* — Holland & Hart LLP

(57) ABSTRACT

Methods, systems, and devices for wireless communications are described that provide improved repetition techniques for autonomous uplink transmissions. Configuration information may be provided from a base station to a user equipment (UE) for autonomous uplink transmissions, that may indicate initial resources for an initial uplink transmission slot and retransmission resources for a number of retransmissions. Time resources within the retransmission resources may be configured to provide enhanced reliability, such as by being configured in non-contiguous slots to avoid one or more other transmission channels. Time resources within slots may also be configured to prevent persistent collisions with autonomous uplink transmissions or retransmissions of two or more different UEs.

28 Claims, 23 Drawing Sheets

(51) Int. Cl.
*H04W 72/14* (2009.01)
*H04W 72/12* (2009.01)

(56) References Cited

OTHER PUBLICATIONS

Huawei, et al., "UL Data Transmission With and Without SR/UL Grant", 3GPP TSG WG1 NR Ad Hoc Meeting, 3GPP Draft, R1-1715419, 3rd Generation Partnership Project (3GPP), Mobile Competence Centre, 650, Route Des Lucioles, F-06921 Sophia-Antipolis Cedex, France, No. Nagoya, Japan, Sep. 18, 2017-Sep. 21, 2017, Sep. 17, 2017 (Sep. 17, 2017), XP051338887, 11 Pages, Retrieved from the Internet: URL: http://www.3gpp.org/ftp/Meetings_3GPP_SYNC/RAN1/Docs/ [retrieved on Sep. 17, 2017], p. 1, Line 1—p. 2, Line 21.

* cited by examiner

REPETITION TECHNIQUES FOR AUTONOMOUS UPLINK TRANSMISSIONS

CROSS REFERENCE

The present Application for patent claims the benefit of U.S. Provisional Patent Application No. 62/712,886 by SUNDARARAJAN, et al., entitled "REPETITION TECHNIQUES FOR AUTONOMOUS UPLINK TRANSMISSIONS," filed Jul. 31, 2018, assigned to the assignee hereof, and expressly incorporated herein.

BACKGROUND

The following relates generally to wireless communications, and more specifically to repetition techniques for autonomous uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless communications system may utilize a grant-based transmission scheme where, for example, a UE requests time-frequency resources for performing an uplink transmission. A UE may request such resources by transmitting a scheduling request (SR) to a base station. The base station may transmit an uplink grant to the UE, such as via downlink control information (DCI) in a physical downlink control channel (PDCCH) transmission. Some wireless communications systems may support a grant-free transmission scheme, also referred to as an autonomous uplink (AUL) scheme, in which time-frequency resources are allocated to one or more UEs (e.g., via a configured grant provided by the base station through radio resource control (RRC) signaling) and UEs are able to utilize these resources for uplink transmission without transmitting an SR. Accordingly, such autonomous uplink transmission schemes may reduce signaling overhead associated with the SR and DCI grant, and thereby enhance system efficiency. In order to enhance reliability for autonomous uplink transmissions, the configured resources may include resources that are available for retransmissions of an uplink transmission, which may enhance the reliability of the uplink transmission being successfully received. Techniques to enhance the reliability and robustness of autonomous uplink retransmissions may thus be desirable to enhance system reliability.

SUMMARY

The described techniques relate to improved methods, systems, devices, and apparatuses that support repetition techniques for autonomous uplink transmissions. Various described techniques provide for autonomous uplink transmissions from a user equipment (UE) to a base station, in which a configured grant may indicate initial resources for an initial uplink transmission slot and retransmission resources for a number of retransmissions. In some cases, time resources within the retransmission resources may be configured to provide enhanced reliability. For example, time resources may be configured in non-contiguous slots to avoid one or more other transmission channels (e.g., physical downlink control channel (PDCCH) transmissions, physical downlink control channel (PDCCH) transmissions, or both). Additionally or alternatively, time resources within slots may be configured to prevent persistent collisions with autonomous uplink transmissions or retransmissions of two or more different UEs.

A method of wireless communications at a UE is described. The method may include receiving configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmitting a first autonomous uplink transmission via the initial uplink resources, and retransmitting the first autonomous uplink transmission via at least first retransmission resources in a first slot of the set of transmission slots.

An apparatus for wireless communications at a UE is described. The apparatus may include a processor, memory in electronic communication with the processor, and instructions stored in the memory. The instructions may be executable by the processor to cause the apparatus to receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmit a first autonomous uplink transmission via the initial uplink resources, and retransmit the first autonomous uplink transmission via at least first retransmission resources in a first slot of the set of transmission slots.

Another apparatus for wireless communications at a UE is described. The apparatus may include means for receiving configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmitting a first autonomous uplink transmission via the initial uplink resources, and retransmitting the first autonomous uplink transmission via at least first retransmission resources in a first slot of the set of transmission slots.

A non-transitory computer-readable medium storing code for wireless communications at a UE is described. The code may include instructions executable by a processor to receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmit a first autonomous uplink transmission via the initial uplink resources, and retransmit the first autonomous uplink transmission via at least first retransmission resources in a first slot of the set of transmission slots.

In some examples of the method, apparatuses, and non-transitory computer-readable medium described herein, the retransmitting further may include operations, features, means, or instructions for retransmitting the first autonomous uplink transmission via second retransmission resources in a second slot of the set of transmission slots, where the first retransmission resources and the second retransmission resources occupy different time resources within the respective first slot and second slot. In some examples of the method, apparatuses, and non-transitory computer-readable medium described herein, the first retransmission resources occupy a first set of symbols and the second retransmission resources occupy a second set of symbols, and where the first set of symbols may be non-overlapping with the second set of symbols.

In some examples of the method, apparatuses, and non-transitory computer-readable medium described herein, the retransmitting further may include operations, features, means, or instructions for retransmitting the first autonomous uplink transmission via second retransmission resources in a second slot of the first subset of slots that may be non-contiguous with the first slot. In some examples of the method, apparatuses, and non-transitory computer-readable medium described herein, the retransmission resources may be configured in a first subset of slots that may be uniformly spaced within the set of slots. In some examples of the method, apparatuses, and non-transitory computer-readable medium described herein, the first subset of slots include alternating slots within the set of slots. In some examples of the method, apparatuses, and non-transitory computer-readable medium described herein, the first subset of slots may be configured in every Mth slot within the set of transmission slots, and where a value of M may be provided in the configuration information. In some examples of the method, apparatuses, and non-transitory computer-readable medium described herein, the retransmission resources may be configured in a first subset of slots that may be distributed in a non-uniform pattern within the set of transmission slots, and where the configuration information indicates which slots of the set of transmission slots may have retransmission resources. In some examples of the method, apparatuses, and non-transitory computer-readable medium described herein, the retransmission resources may be non-overlapping with one or more configured uplink channels or downlink channels.

In some examples of the method, apparatuses, and non-transitory computer-readable medium described herein, the retransmission resources include a number of sets of time symbols within each slot of the set of transmission slots, and where retransmissions in different slots of the set of transmission slots use different sets of time symbols from the number of sets of time symbols. In some examples of the method, apparatuses, and non-transitory computer-readable medium described herein, the retransmission resources may have a preconfigured pattern over the set of transmission slots, and where the configuration information indicates which of a set of preconfigured patterns may be to be used by the UE.

In some examples of the method, apparatuses, and non-transitory computer-readable medium described herein, the retransmission resources span a set of slots of the set of transmission slots, and where the first slot may have a first set of frequency resources and a subsequent slot of the set of transmission slots may have a second set of frequency resources that spans a different number of frequency resources than the first set of frequency resources. Some examples of the method, apparatuses, and non-transitory computer-readable medium described herein may further include operations, features, means, or instructions for receiving an early termination indication from the base station and discontinuing retransmitting the first autonomous uplink transmission, based on the early termination indication.

In some examples of the method, apparatuses, and non-transitory computer-readable medium described herein, the receiving the configuration information may include operations, features, means, or instructions for receiving a time hopping offset that may be used to repeatedly shift forward a starting symbol of time resources indicated by a start and length indicator value (SLIV) for each subsequent retransmission. In some examples of the method, apparatuses, and non-transitory computer-readable medium described herein, the receiving the configuration information may include operations, features, means, or instructions for receiving a sequence of different time offsets that indicate a starting time resource for each successive retransmission. In some examples of the method, apparatuses, and non-transitory computer-readable medium described herein, the configuration information may be received via RRC signaling, DCI through a physical downlink control channel, a group common PDCCH transmission, or any combinations thereof.

A method of wireless communications at a base station is described. The method may include transmitting configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receiving a first autonomous uplink transmission from the first UE via the initial uplink resources, and receiving at least a first retransmission of the first autonomous uplink transmission from the first UE via at least first retransmission resources in a first slot of the set of transmission slots.

An apparatus for wireless communications at a base station is described. The apparatus may include a processor, memory in electronic communication with the processor, and instructions stored in the memory. The instructions may be executable by the processor to cause the apparatus to transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receive a first autonomous uplink transmission from the first UE via the initial uplink resources, and receive at least a first retransmission of the first autonomous uplink transmission from the first UE via at least first retransmission resources in a first slot of the set of transmission slots.

Another apparatus for wireless communications at a base station is described. The apparatus may include means for transmitting configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receiving a first autonomous uplink transmission from the first UE via the initial uplink resources, and receiving at least a first retransmission of the first autonomous uplink transmission from the first UE via at least first retransmission resources in a first slot of the set of transmission slots.

A non-transitory computer-readable medium storing code for wireless communications at a base station is described. The code may include instructions executable by a processor to transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receive a first autonomous uplink transmission from the first UE via the initial uplink resources, and receive at least a first retransmission of the first autonomous uplink transmission from the first UE via at least first retransmission resources in a first slot of the set of transmission slots.

Some examples of the method, apparatuses, and non-transitory computer-readable medium described herein may further include operations, features, means, or instructions for configuring the first UE with a first set of retransmission resources and the second UE with a second set of retransmission resources, where at least a portion of the first set of retransmission resources may be non-overlapping in time with the second set of retransmission resources. In some examples of the method, apparatuses, and non-transitory computer-readable medium described herein, the receiving at least the first retransmission further may include operations, features, means, or instructions for receiving a second retransmission of the first autonomous uplink transmission from the first UE via second retransmission resources in a second slot of the set of transmission slots, where the first retransmission resources and the second retransmission resources occupy different time resources within the respective first slot and second slot. In some examples of the method, apparatuses, and non-transitory computer-readable medium described herein, the first retransmission resources occupy a first set of symbols and the second retransmission resources occupy a second set of symbols, and where the first set of symbols may be non-overlapping with the second set of symbols.

In some examples of the method, apparatuses, and non-transitory computer-readable medium described herein, the receiving at least the first retransmission further may include operations, features, means, or instructions for receiving a second retransmission of the first autonomous uplink transmission from the first UE via second retransmission resources in a second slot of the first subset of slots that may be non-contiguous with the first slot. In some examples of the method, apparatuses, and non-transitory computer-readable medium described herein, the retransmission resources may be configured in a first subset of slots that may be uniformly spaced within the set of slots. In some examples of the method, apparatuses, and non-transitory computer-readable medium described herein, the first subset of slots include alternating slots within the set of slots. In some examples of the method, apparatuses, and non-transitory computer-readable medium described herein, the first subset of slots may be configured in every Mth slot within the set of transmission slots, and where a value of M may be provided in the configuration information. In some examples of the method, apparatuses, and non-transitory computer-readable medium described herein, the retransmission resources may be configured in a first subset of slots that may be distributed in a non-uniform pattern within the set of transmission slots, and where the configuration information indicates which slots of the set of transmission slots may have retransmission resources. In some examples of the method, apparatuses, and non-transitory computer-readable medium described herein, the retransmission resources may be non-overlapping with one or more configured uplink channels or downlink channels.

In some examples of the method, apparatuses, and non-transitory computer-readable medium described herein, the retransmission resources include a number of sets of time symbols within each slot of the set of transmission slots, and where retransmissions of each of the first UE and the second UE in different slots of the set of transmission slots use different sets of time symbols from the number of sets of time symbols. In some examples of the method, apparatuses, and non-transitory computer-readable medium described herein, the retransmission resources may have a preconfigured pattern over the set of transmission slots, and where the configuration information indicates a first preconfigured pattern for the first UE and a second preconfigured pattern for the second UE.

In some examples of the method, apparatuses, and non-transitory computer-readable medium described herein, the retransmission resources span a set of slots of the set of transmission slots, and where the first slot may have a first set of frequency resources and a subsequent slot of the set of transmission slots may have a second set of frequency resources that spans more frequency resources than the first set of frequency resources. Some examples of the method, apparatuses, and non-transitory computer-readable medium described herein may further include operations, features, means, or instructions for determining that the first autonomous transmission may be successfully received at the base station, transmitting an early termination indication to the first UE and discontinuing attempts to receive further retransmissions of the first autonomous uplink transmission, based on the early termination indication.

In some examples of the method, apparatuses, and non-transitory computer-readable medium described herein, the configuration information includes a time hopping offset that may be used to repeatedly shift forward a starting symbol of time resources indicated by a start and length indicator value (SLIV) for each subsequent retransmission. In some examples of the method, apparatuses, and non-transitory computer-readable medium described herein, the configuration information includes a sequence of different time offsets that indicate a starting time resource for each successive retransmission. In some examples of the method, apparatuses, and non-transitory computer-readable medium described herein, the configuration information may be transmitted via RRC signaling, DCI through a physical downlink control channel, a group common PDCCH transmission to a group of UEs, or any combinations thereof.

DETAILED DESCRIPTION

Figure 1:
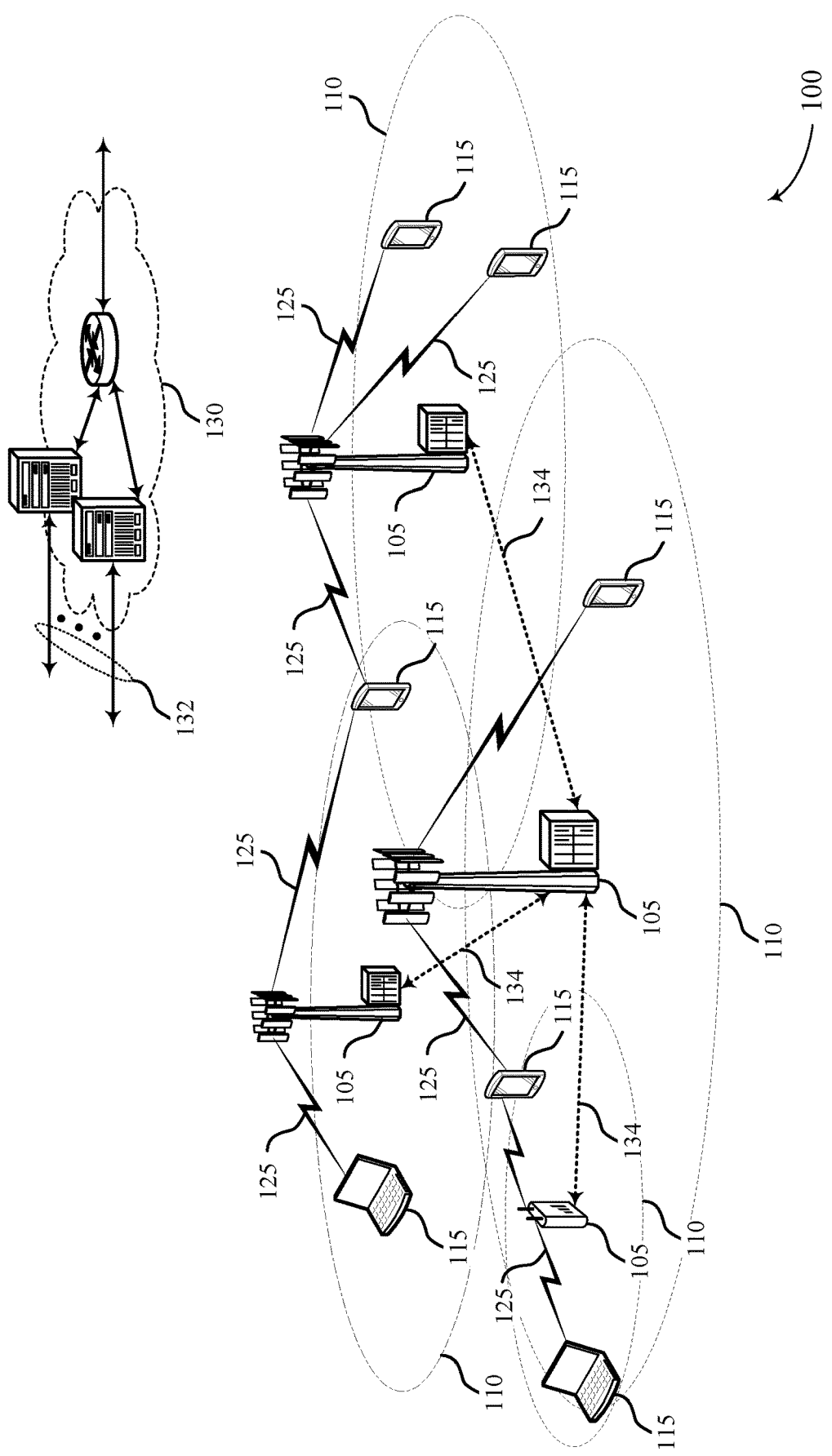
FIG. 1 illustrates an example of a system for wireless communications that supports repetition techniques for autonomous uplink transmissions in accordance with aspects of the present disclosure.

Various aspects of the present disclosure provide improved methods, systems, devices, and apparatuses for autonomous uplink transmissions. In some cases, a base station may provide an autonomous uplink transmission configuration to a user equipment (UE), which may indicate configured resources for an initial autonomous uplink transmission and one or more retransmissions. In some cases, time resources within the retransmission resources may be configured to provide enhanced reliability. For example, time resources may be configured in non-contiguous slots to avoid one or more other transmission channels (e.g., physical downlink shared channel (PDSCH) transmissions, physical downlink control channel (PDCCH) transmissions, or both). Additionally or alternatively, time resources within slots may be configured to prevent persistent collisions with autonomous uplink transmissions or retransmissions of two or more different UEs. In some cases, different amounts of frequency resources may be configured for different retransmissions. A UE operating according to the autonomous uplink configuration may transmit an autonomous uplink transmission and one or more retransmissions of the uplink transmission, which may enhance the likelihood of successful reception of the uplink transmission at the base station.

As indicated above, such autonomous uplink transmissions may enhance system efficiency through reduced signaling overhead and latency. For example, when utilizing a grant-based transmission scheme to indicate time-frequency resources on which a UE or a base station may transmit data, a UE that has data to transmit may transmit a scheduling request (SR) to a base station, and the base station may reply to the UE with an uplink grant indicating resources on which to transmit the data. The UE may then use the assigned resources to transmit the data. This grant-based uplink operation, however, incurs a delay from the time at which data becomes available at the UE to transmit and the time at which the UE transmits the data on the assigned resources, and also incurs overhead associated with the multiple signaling transmissions.

Autonomous uplink transmissions may help reduce latency and signaling overhead associated with exchanging the SR and the grant. In some cases, a base station may configure the UE (e.g., via a configured grant that is provided via radio resource control (RRC) signaling) with one or more patterns of resources for a set of channels on which the UE may transmit data without having first received an uplink grant. The configured uplink resources may also indicate resources for retransmissions of the uplink data. Such retransmissions may help enhance system reliability, because the base station may not detect the initial data transmission from the UE, and because the UE does not indicate that a transmission has occurred, the base station may not send feedback to indicate a decoding failure. Thus, the configuration information may indicate a number of repetitions to be provided (e.g., the configured grant conveys repK, that indicates the number of times the UE may repeat each transmission).

According to various aspects of the present disclosure, time resources for retransmissions of the K repetitions may occur in non-contiguous slots, in different time resources within different slots, or combinations thereof. Such time resources may be selected to avoid one or more other channels that may be present within a set of slots that include the autonomous uplink resources. For example, if PDSCH resources are configured in one or more slots that are within K slots from the initial autonomous uplink transmission, the retransmission resources may avoid the PDSCH resources, rather than skipping one or the repetitions. Thus, all K repetitions may be transmitted, which may enhance system reliability. Further, such autonomous uplink transmissions may be utilized in a service that requires high reliability and low latency (e.g., a ultra-reliability low latency communication (URLLC) service), and thus enhanced reliability for autonomous uplink transmissions may help to meet reliability criteria of such services. Further, in cases where multiple UEs are configured with overlapping autonomous uplink resources, the time resources within slots for each UE may be selected to prevent persistent collisions of different UEs.

Aspects of the disclosure are initially described in the context of a wireless communications system utilizing various disclosed autonomous uplink transmission and retransmission techniques. Aspects of the disclosure are further illustrated by and described with reference to apparatus diagrams, system diagrams, and flowcharts that relate to repetition techniques for autonomous uplink transmissions.

FIG. 1 illustrates an example of a wireless communications system 100 that supports repetition techniques for autonomous uplink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. UEs 115 may, in some cases, be configured for autonomous uplink transmissions and retransmissions, which may enhance system efficiency by reducing latency and enhancing reliability.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

As indicated above, in some cases a base station 105 may provide an autonomous uplink transmission configuration to a UE 115, which may indicate configured resources for an initial autonomous uplink transmission and one or more retransmissions of the initial transmission. In some cases, time resources within the retransmission resources may be configured to provide enhanced reliability. For example, time resources may be configured in non-contiguous slots to avoid one or more other transmission channels (e.g., PDCCH or PDSCH transmissions). Additionally or alternatively, time resources within slots may be configured to prevent persistent collisions with autonomous uplink transmissions or retransmissions of two or more different UEs 115. In some cases, different amounts of frequency resources may be configured for different retransmissions. A UE 115 operating according to the autonomous uplink configuration may transmit an autonomous uplink transmission and one or more retransmissions of the uplink transmission, which may enhance the likelihood of successful reception of the uplink transmission at the base station 105.

Figure 2:
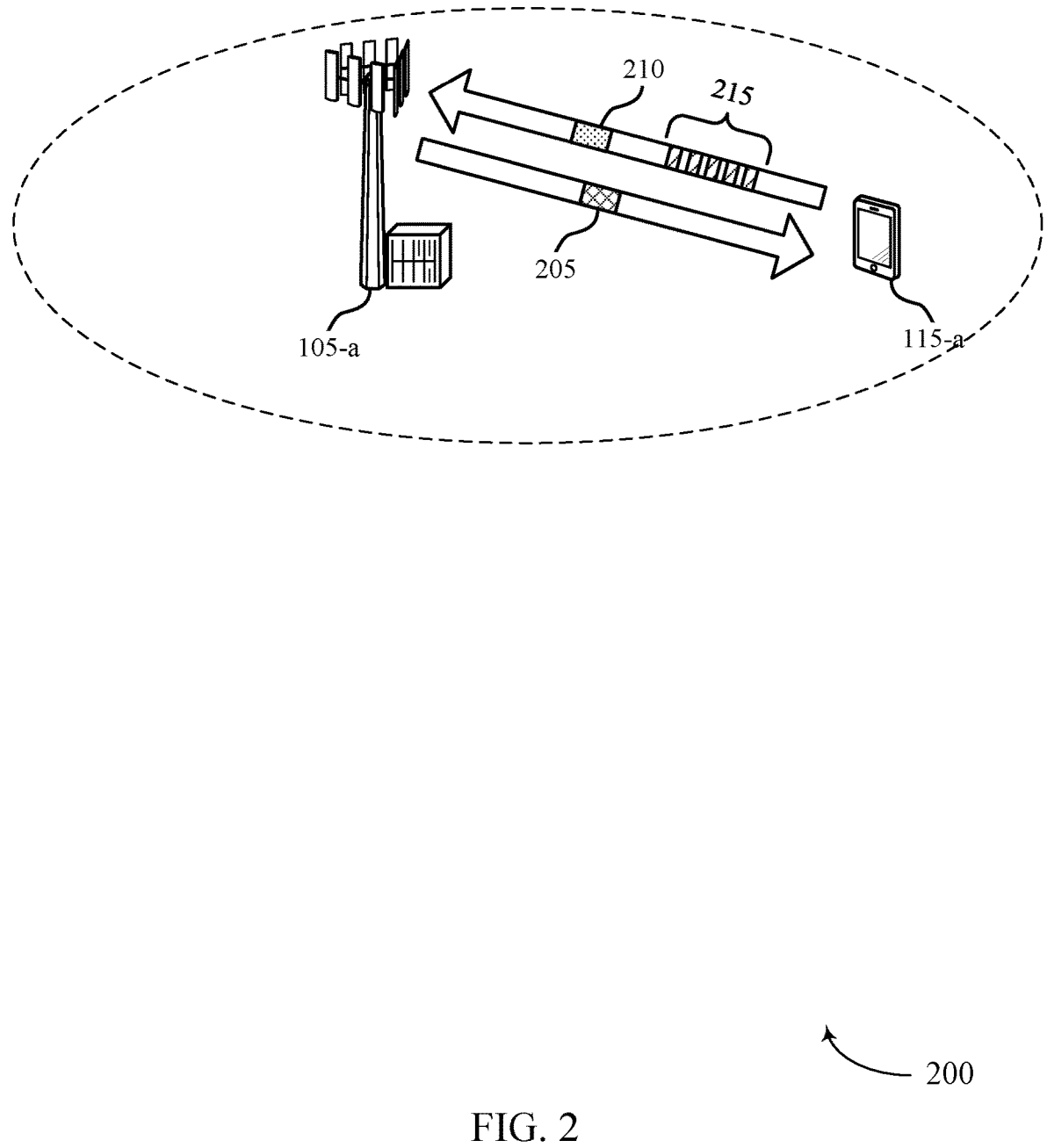
FIG. 2 illustrates an example of a portion of a wireless communications system that supports repetition techniques for autonomous uplink transmissions in accordance with aspects of the present disclosure.

FIG. 2 illustrates an example of a wireless communications system 200 that supports repetition techniques for autonomous uplink transmissions in accordance with aspects of the present disclosure. In some examples, wireless communications system 200 may implement aspects of wireless communications system 100. Wireless communications system 200, in this example, includes a base station 105-a and UE 115-a which may be examples of the corresponding devices as described with reference to FIG. 1. In the below examples, a particular operation may be described with reference to a UE 115 or a base station 105, but it should be understood that the operation may also be performed by either a UE 115 or a base station 105. Similarly, the autonomous uplink configurations may be described with reference to an autonomous uplink configuration, but it should be understood that analogous operations may be applied for the downlink (e.g., in a P2P or D2D system).

Wireless communications system 200 may utilize autonomous uplink transmission and retransmission techniques in which the base station 105-a may provide an autonomous uplink configuration 205. In some cases, the autonomous uplink configuration 205 may be provided via one or more RRC messages, a DCI message through PDCCH, a group common PDCCH message to a group of UEs 115, or any combinations thereof. The autonomous uplink configuration 205 may indicate uplink resources that the UE 115-a may use for an autonomous uplink transmission 210, and a number of retransmissions 215 of the autonomous uplink transmissions (e.g., configured by a value of repK, where K indicates a number of repetitions). As indicated above, the resources for retransmissions may be configured such that retransmissions avoid downlink channel resources (e.g., PDCCH/PDSCH resources) and also avoid persistent collisions with retransmissions of one or more other UEs 115. In some cases, autonomous uplink configuration 205 may configure repetitions through a time hopping offset that may be used to repeatedly shift forward the start symbol of the time resources indicated by a start and length indicator value (SLIV) for each subsequent retransmission, with wraparound if the edge of the slot is reached. In some cases, a sequence of different time offsets relative to the beginning of the slot may be configured to be applied to successive retransmissions.

The autonomous uplink configuration 205 may, for example, use higher layer signaling (e.g., RRC signaling) to specify a modulation and coding scheme, resource allocation, and periodicity of resources allocated for autonomous uplink transmissions. In some cases, layer 1 (L1) signaling may signal activation or deactivation of resources for autonomous uplink transmissions. The L1 signaling may also be used to indicate a modulation and coding scheme, a resource allocation, and periodicity of resources allocated for autonomous uplink transmissions. In some examples, base station 105-a may utilize a group physical control channel (e.g., a GC-PDCCH) to administer autonomous uplink transmissions.

Thus, the base station 105-a may configure resources for initial autonomous uplink transmission 210 and one or more retransmissions 215 of the initial transmission. In some cases, time resources for the one or more retransmissions 215 may be configured in non-contiguous slots to avoid one or more other transmission channels (e.g., PDCCH or PDSCH transmissions). Additionally or alternatively, time resources within slots may be configured to prevent persistent collisions with autonomous uplink transmissions of one or more other UEs. In some cases, different amounts of frequency resources may be configured for different retransmissions. Several non-limiting examples of configurations for time and frequency resources are provided below in FIGS. 3 through 5.

Figure 3:
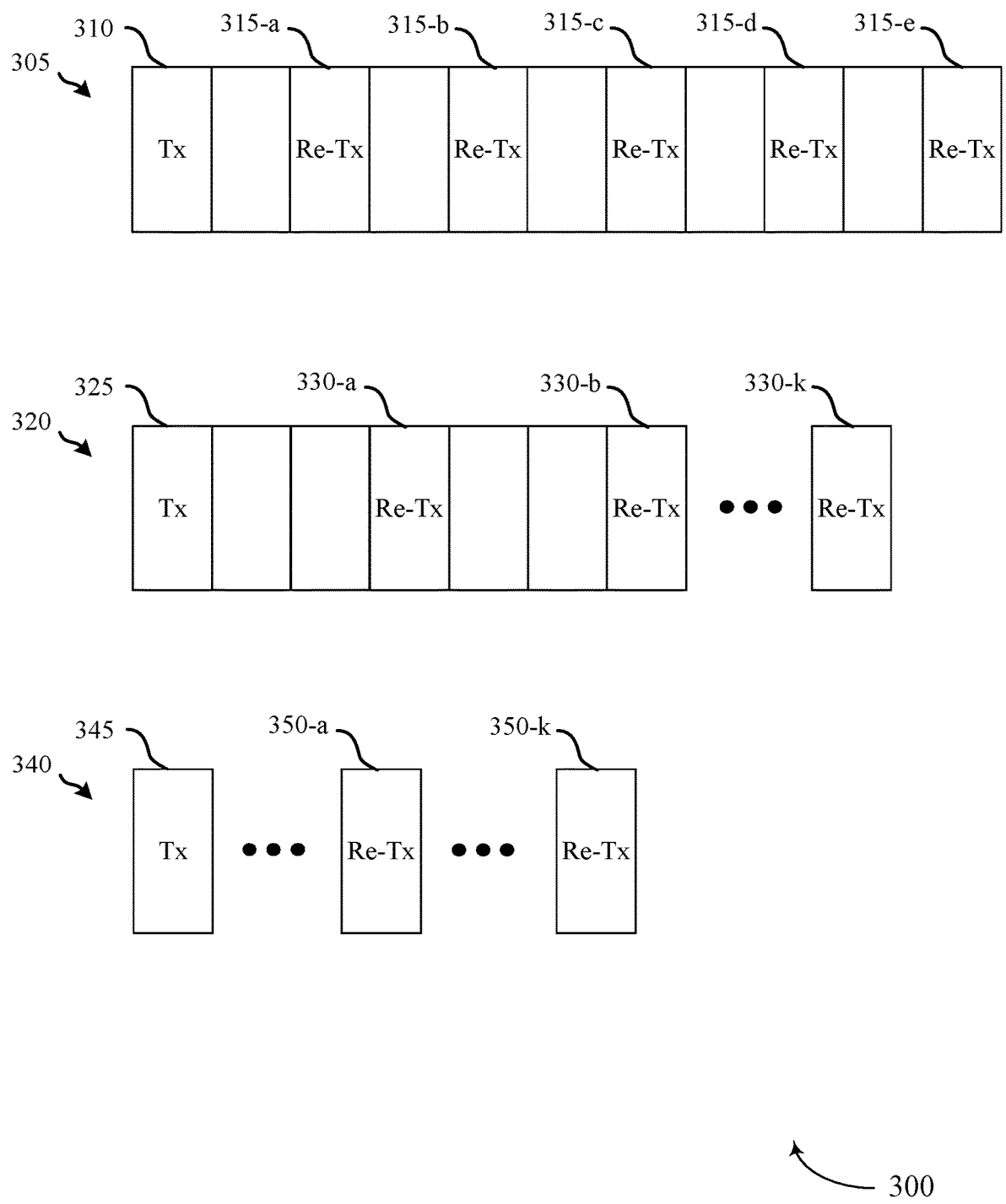
FIG. 3 illustrates an example of autonomous uplink resources that support repetition techniques for autonomous uplink transmissions in accordance with aspects of the present disclosure.

FIG. 3 illustrates examples of autonomous uplink resources 300 with non-contiguous retransmission resources that support repetition techniques for autonomous uplink transmissions in accordance with aspects of the present disclosure. In some examples, autonomous uplink resources 300 may implement aspects of wireless communications system 100 or 200. Various examples 305, 320, and 340 illustrate different time resources that may be configured in accordance with techniques provided herein. In the examples of FIG. 3, instead of restricting the K repetitions to occur in contiguous slots, the configured grant may provide an indication of which slots in which the K repetitions should occur.

In a first example 305, an initial autonomous uplink transmission may be transmitted in a first slot 310, and retransmissions of the initial autonomous uplink transmission may be transmitted in subsequent slots 315 that may be uniformly distributed in a pattern with alternating slots that contain retransmission resources and that do not contain retransmission resources. In a second example 320, the autonomous uplink configuration (e.g., a configured grant) may provide for an initial transmission in first slot 325 with retransmissions following uniform pattern in which every $M^{th}$ slot 330 has a retransmission. In such cases, the autonomous uplink configuration information may provide an integer value for M.

In a third example 340, the retransmission resources may be either uniformly distributed within a set of slots, or may be distributed in a non-uniform pattern. In this case, an initial transmission may be transmitted in first slot 345, and subsequent slots 350 of a set of slots may be configured for retransmissions. In some cases, the configuration information may indicate which slots of the set of slots are for retransmissions (e.g., via a bitmap or through a time hopping offset (such as the integer M) that may be used to repeatedly shift forward a slot index used for each subsequent retransmission). In some cases, a sequence of different time offsets may be configured to be applied to successive retransmissions. The configured pattern may be different for different UEs, which may prevent persistent collisions of the repetitions that may be transmitted by each UE (e.g., in a group of UEs configured with a same set of autonomous uplink resources). Further, configuring which slots are to be used for retransmissions may allow a base station to incorporate other channels and/or downlink transmissions within the set of autonomous uplink resources and also maintain that each UE transmits each of the configured repetitions. While the examples of FIG. 3 (and FIGS. 4 and 5) illustrate slot-based transmissions, techniques provided herein may be applied to any scheduling duration or transmission time interval, such as mini-slot based transmissions for example.

Figure 4:
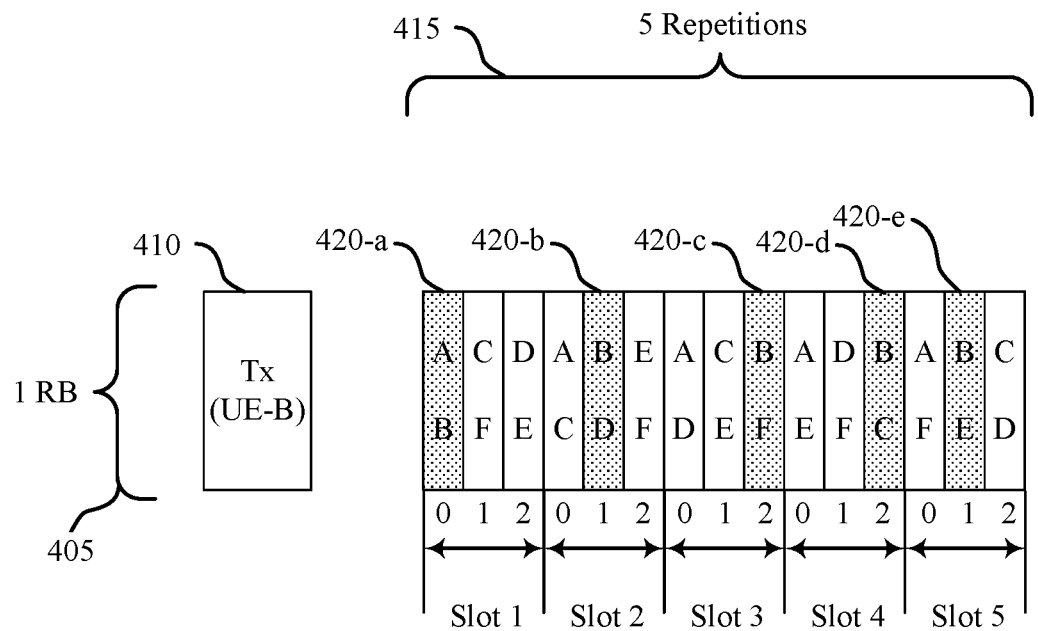
FIG. 4 illustrates an example of time resources within slots of autonomous uplink resources that support repetition techniques for autonomous uplink transmissions in accordance with aspects of the present disclosure.

FIG. 4 illustrates an example of a time resources within slots of autonomous uplink resources 400 that supports repetition techniques for autonomous uplink transmissions in accordance with aspects of the present disclosure. In some examples, time resources within slots of autonomous uplink resources 400 may implement aspects of wireless communications system 100 or 200. In this example, different resources within a slot may be allocated for different slots, such that a set of OFDM symbols used within the slot may be different for each repetition based on a pre-configured pattern, which may be different for different UEs.

In this example, each slot is partitioned into three groups or sets of OFDM symbols, with partition 0 having symbols 0-4, partition 1 having symbols 5-8, and partition 2 having symbols 9-12. In some cases, a time hopping offset that may be used to repeatedly shift forward the start symbol of the time resources indicated by a SLIV for each subsequent retransmission such that the starting point corresponding to the allocated 4 symbols within the slot is changing for each repetition. In some cases, a pattern of time hopping offsets may be configured for the configured number of repetitions. For a one resource block (RB) 405 example, a UE (UE B in this example) may transmit an initial autonomous uplink transmission 410, followed by a number of retransmissions 415 that may follow in subsequent slots. In this example, retransmissions 415 are illustrated as in consecutive slots subsequent to the initial autonomous uplink transmission 410, but such techniques may also be used in cases where retransmission resources are located in non-contiguous slots such as discussed above. Further, in some examples, the length of the allocation may also change. For example, instead of always using 4 symbols, a UE may use a different number of symbols in each repetition. Such different lengths of allocations may avoid overlapping with downlink symbols that occur in some slots but not in others. Additionally or alternatively, the SLIV offset to be applied may depend on the slot number, and not the retransmission number. For example, in a retransmission number j occurs in slot number k, then the SLIV offset may be computed using k and not j. In such cases, if different UEs start their transmission at different points in time, the UEs apply the offset based on the current slot number irrespective of the retransmission. Thus, the desirable properties of time hopping to avoid persistent collisions can be obtained for such UEs.

In the example of FIG. 4, a first retransmission 420-a may be transmitted in partition 0 of a first slot subsequent to the initial autonomous uplink transmission 410. A second retransmission 420-b may be transmitted in partition 1 of a second slot, followed by a third retransmission 420-c in partition 2 of a third slot, a fourth retransmission 420-d in partition 2 of a fourth slot and a fifth retransmission 420-e in partition 1 of a fifth slot. As illustrated in FIG. 4, multiple UEs may be configured for retransmissions using the same retransmission resources, such that for any one UE, the allocated symbols hop across repetitions in a UE-specific manner. Thus, for any pair of UEs, the hopping pattern avoids persistent collision among one cycle of repetitions. For example, for the first retransmission 420-a, the UE may potentially have a collision with UE A, if UE A were to also have an autonomous uplink transmission or retransmission in the first slot. However, such a collision would not persist across each retransmission occasion, which may thus enhance the likelihood of successful reception at the base station.

Figure 5:
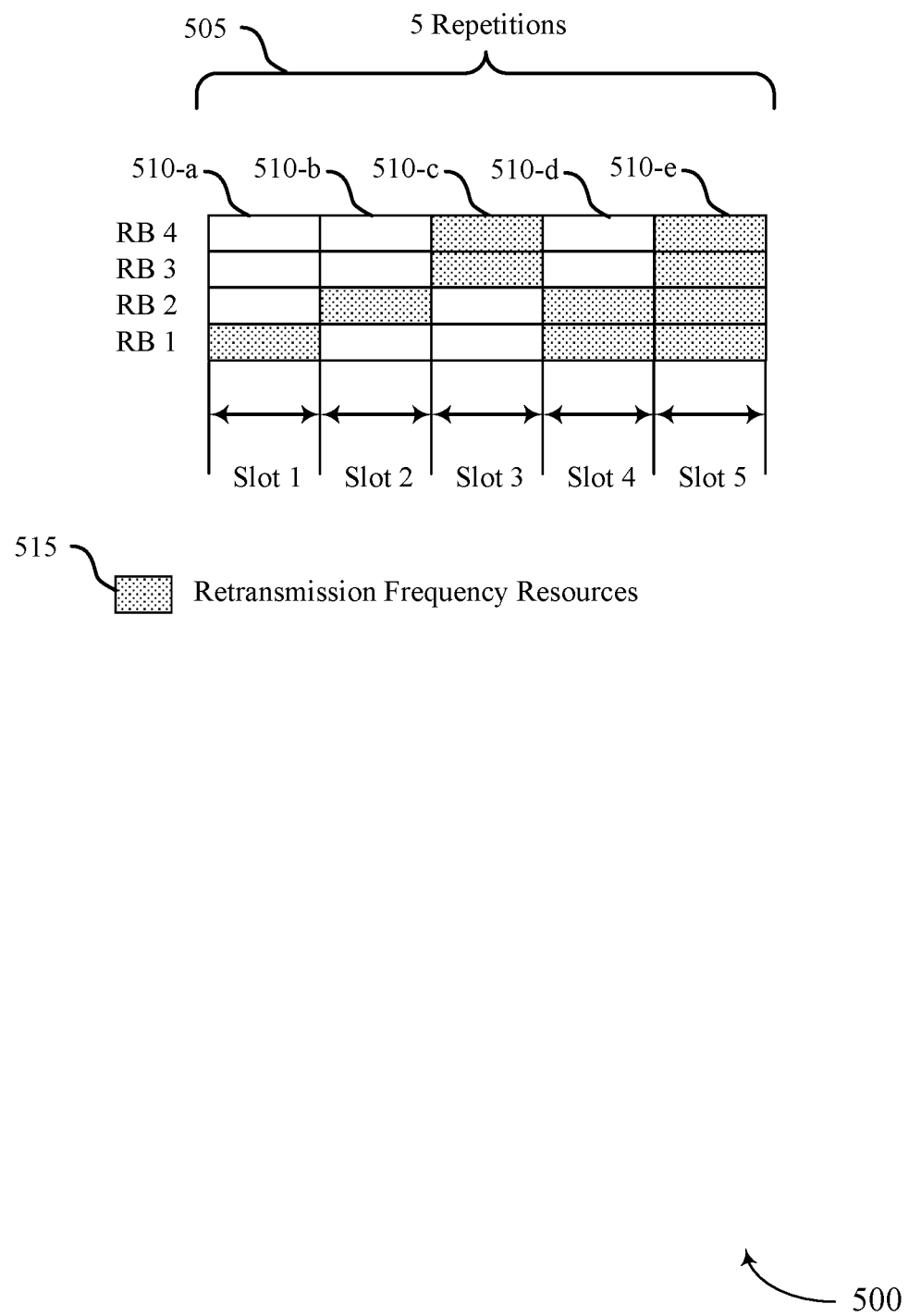
FIG. 5 illustrates an example of frequency resources within autonomous uplink resources that support repetition techniques for autonomous uplink transmissions in accordance with aspects of the present disclosure.

FIG. 5 illustrates an example of a frequency resources within autonomous uplink resources 500 that supports repetition techniques for autonomous uplink transmissions in accordance with aspects of the present disclosure. In some examples, frequency resources within autonomous uplink resources 500 may implement aspects of wireless communications system 100 or 200. In this example, a number of repetitions 505 may be configured in which different repetitions use a different amount of frequency resources 515. More specifically, a first repetition 510-a and a second repetition 510-b may each use frequency resources 515 that span one RB of retransmission resources, a third repetition 510-c and a fourth repetition 510-d may each use two RBs, and a fifth repetition 510-e may use four RBs. Such increasing frequency allocation may be used in conjunction with frequency hopping techniques, in some cases.

Such increasing frequency domain resource allocation as the number of repetitions increase may help improve the overall reliability of the transmission, with the latest retransmissions having relatively higher likelihood of successful reception at a base station due to modulation and coding scheme changes that can be made according to the increased frequency resource allocations. In some cases, to help prevent overloading or congestion from multiple UEs each using increasing resources in subsequent retransmissions, the base station may indicate early termination of the repetitions upon successful decoding. For example, the base station may determine that the uplink transmission is successfully received after the first retransmission, and may transmit the early termination indication (e.g., a HARQ ACK). The UE, upon receiving the early termination indication, may discontinue the retransmissions, thus avoiding using resources in later slots.

Figure 6:
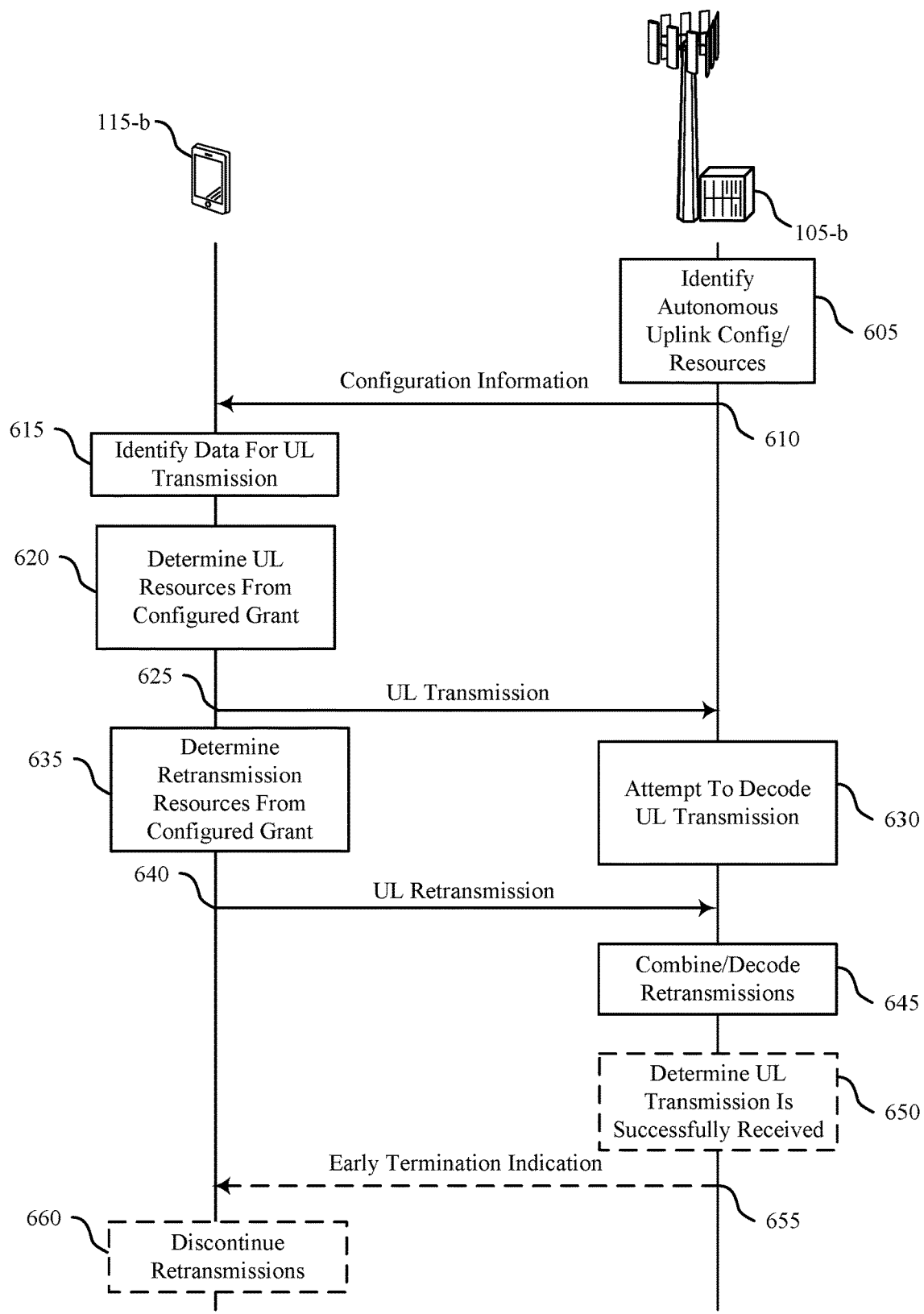
FIG. 6 illustrates an example of a process flow that supports repetition techniques for autonomous uplink transmissions in accordance with aspects of the present disclosure.

FIG. 6 illustrates an example of a process flow 600 that supports repetition techniques for autonomous uplink transmissions in accordance with aspects of the present disclosure. In some examples, process flow 600 may implement aspects of wireless communications system 100. Process flow 600 includes a UE 115-b and a base station 105-b, which may be respective examples of a UE 115 and a base station 105 as described with reference to FIGS. 1 and 2.

At 605, the base station 105-b may identify an autonomous uplink configuration and resources (e.g., grant-free uplink configurations) for UE 115-b. At 610, the base station 105-b may transmit to the UE 115-b, and the UE 115-b may receive from the base station 105-b, a message that indicates the autonomous uplink configuration and resources. In some cases, the message may be provided via RRC signaling to the UE 115-b that provides a configured grant. The signaling at 610 may, in some cases, be optional. For instance, the wireless communications system supporting communications between UE 115-b and base station 105-b may have previously configured the autonomous uplink configurations and/or resources.

At 615, the UE 115-b may identify data for uplink transmission. In some cases, the data may be associated with a service that has low latency and high reliability requirements (e.g., a URLLC service), and thus that the data is to be transmitted in an autonomous uplink transmission according to the autonomous uplink configuration.

At 620, the UE 115-*b* may determine uplink resources for the autonomous uplink transmission. In some cases, the uplink resources may be determined from a configured grant. The UE 115-*b* may, at 625, transmit the autonomous uplink transmission to the base station 105-*b*, which the base station 105-*b* may attempt to decode at 630.

At 635, the UE 115-*b* may determine configured retransmission resources for one or more retransmissions of the uplink transmission. The UE 115-*b* may determine the retransmission resources according to techniques discussed herein. For example, the UE 115-*b* may identify non-contiguous slots for retransmissions, resources within each slot, or combinations thereof. Based on the determined retransmission resources, the UE 115-*b* may transmit one or more retransmissions 640 to the base station 105-*b*.

At 645, the base station 105-*b* may attempt to decode the transmission. In some cases, the base station may combine each retransmission with the initial transmission (e.g., using soft combining techniques) and attempt to decode the uplink transmission.

Optionally, at 650, the base station 105-*b* may determine that the uplink transmission is successfully received. Such a determination may be made based on successfully decoding the uplink transmission and obtaining the uplink data therefrom.

At 655, if the base station 105-*b* successfully received the uplink transmission, an early termination indication may be transmitted to the UE 115-*b*. The early termination indication may indicate to the UE 115-*b* that the uplink transmission has been successfully received at the base station 105-*b*, and the UE may, at 660, discontinue retransmissions. Such an early termination indication may help prevent congestion of uplink resources that are used for autonomous uplink transmissions, which may be particularly beneficial in cases where successive retransmissions may use more frequency resources.

Figure 7:
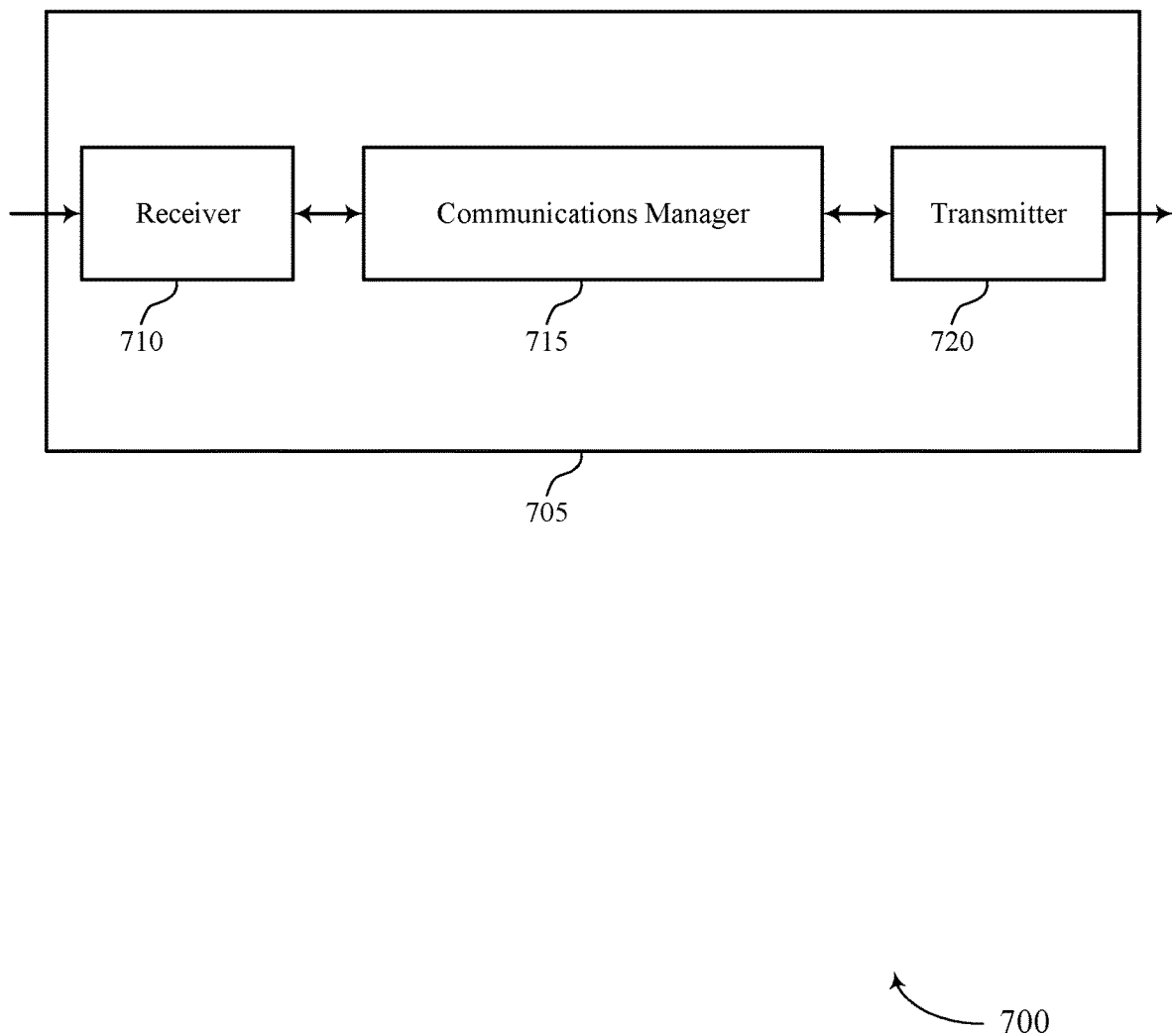
FIGS. 7 and 8 show block diagrams of devices that support repetition techniques for autonomous uplink transmissions in accordance with aspects of the present disclosure.

FIG. 7 shows a block diagram 700 of a device 705 that supports repetition techniques for autonomous uplink transmissions in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to repetition techniques for autonomous uplink transmissions, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmit a first autonomous uplink transmission via the initial uplink resources, and retransmit the first autonomous uplink transmission via at least first retransmission resources in a first slot of the set of transmission slots. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
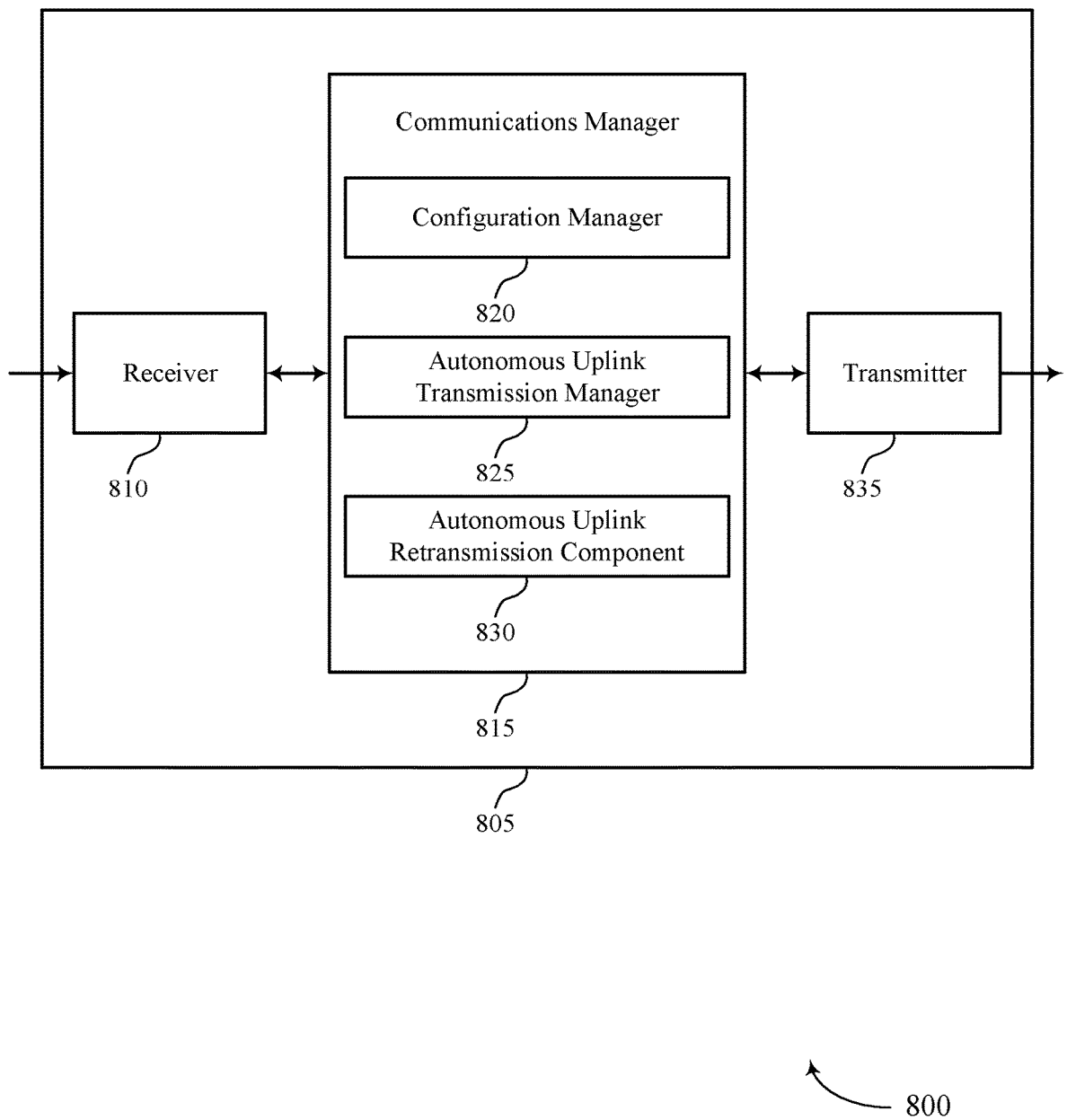

FIG. 8 shows a block diagram 800 of a device 805 that supports repetition techniques for autonomous uplink transmissions in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to repetition techniques for autonomous uplink transmissions, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, an autonomous uplink transmission manager 825, and an autonomous uplink retransmission component 830. The communications manager 815 may be an example of aspects of the communications manager 1010 described herein.

The configuration manager 820 may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently.

The autonomous uplink transmission manager 825 may transmit a first autonomous uplink transmission via the initial uplink resources.

The autonomous uplink retransmission component 830 may retransmit the first autonomous uplink transmission via at least first retransmission resources in a first slot of the set of transmission slots.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
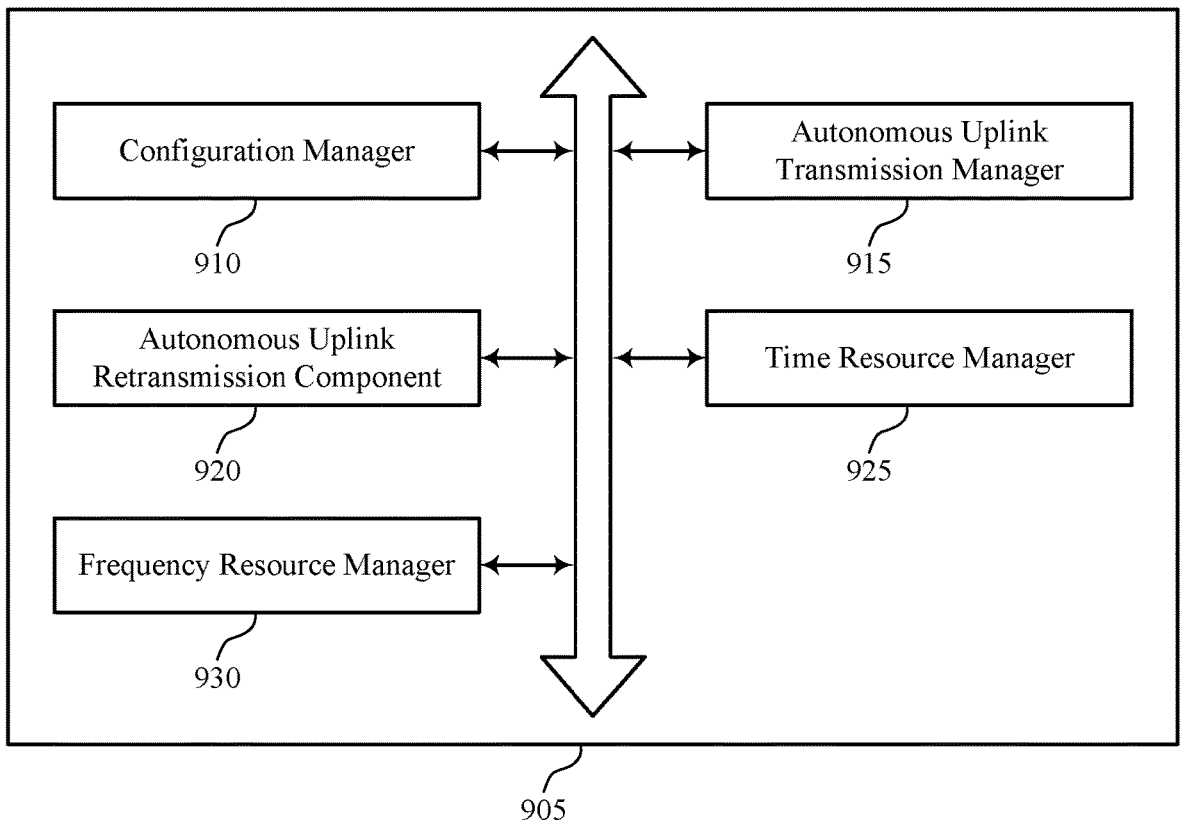
FIG. 9 shows a block diagram of a communications manager that supports repetition techniques for autonomous uplink transmissions in accordance with aspects of the present disclosure.

FIG. 9 shows a block diagram 900 of a communications manager 905 that supports repetition techniques for autonomous uplink transmissions in accordance with aspects of the present disclosure. The communications manager 905 may be an example of aspects of a communications manager 715, a communications manager 815, or a communications manager 1010 described herein. The communications manager 905 may include a configuration manager 910, an autonomous uplink transmission manager 915, an autonomous uplink retransmission component 920, a time resource manager 925, and a frequency resource manager 930. Each of these modules may communicate, directly or indirectly, with one another (e.g., via one or more buses).

The configuration manager 910 may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently. In some examples, the configuration manager 910 may receive a time hopping offset that is used to repeatedly shift forward a starting symbol of time resources indicated by a start and length indicator value (SLIV) for each subsequent retransmission. In some examples, the configuration manager 910 may receive a sequence of different time offsets that indicate a starting time resource for each successive retransmission.

In some cases, the retransmission resources are configured in a first subset of slots that are uniformly spaced within the set of slots, such as in alternating slots within the set of slots. In some cases, the first subset of slots are configured in every Mth slot within the set of transmission slots, and where a value of M is provided in the configuration information. In some cases, the retransmission resources are configured in a first subset of slots that are distributed in a non-uniform pattern within the set of transmission slots, and where the configuration information indicates which slots of the set of transmission slots have retransmission resources. In some cases, the retransmission resources are non-overlapping with one or more configured uplink channels or downlink channels. In some cases, the configuration information is received via RRC signaling, DCI through a physical downlink control channel, a group common PDCCH transmission, or any combinations thereof.

The autonomous uplink transmission manager 915 may transmit a first autonomous uplink transmission via the initial uplink resources.

The autonomous uplink retransmission component 920 may retransmit the first autonomous uplink transmission via at least first retransmission resources in a first slot of the set of transmission slots. In some examples, the autonomous uplink retransmission component 920 may retransmit the first autonomous uplink transmission via second retransmission resources in a second slot of the set of transmission slots, where the first retransmission resources and the second retransmission resources occupy different time resources within the respective first slot and second slot. In some cases, the first retransmission resources occupy a first set of symbols and the second retransmission resources occupy a second set of symbols, and where the first set of symbols are non-overlapping with the second set of symbols.

In some examples, the autonomous uplink retransmission component 920 may retransmit the first autonomous uplink transmission via second retransmission resources in a second slot of the first subset of slots that is non-contiguous with the first slot.

In some examples, the autonomous uplink retransmission component 920 may receive an early termination indication from the base station. In some examples, the autonomous uplink retransmission component 920 may discontinue retransmitting the first autonomous uplink transmission, based on the early termination indication.

The time resource manager 925 may identify time resources for retransmissions. In some cases, the retransmission resources include a set of sets of time symbols within each slot of the set of transmission slots, and where retransmissions in different slots of the set of transmission slots use different sets of time symbols from the set of sets of time symbols. In some cases, the retransmission resources have a preconfigured pattern over the set of transmission slots, and where the configuration information indicates which of a set of preconfigured patterns is to be used by the UE.

The frequency resource manager 930 may identify frequency resources for retransmissions. In some cases, the retransmission resources span a set of slots of the set of transmission slots, and where the first slot has a first set of frequency resources and a subsequent slot of the set of transmission slots has a second set of frequency resources that spans a different number of frequency resources than the first set of frequency resources.

Figure 10:
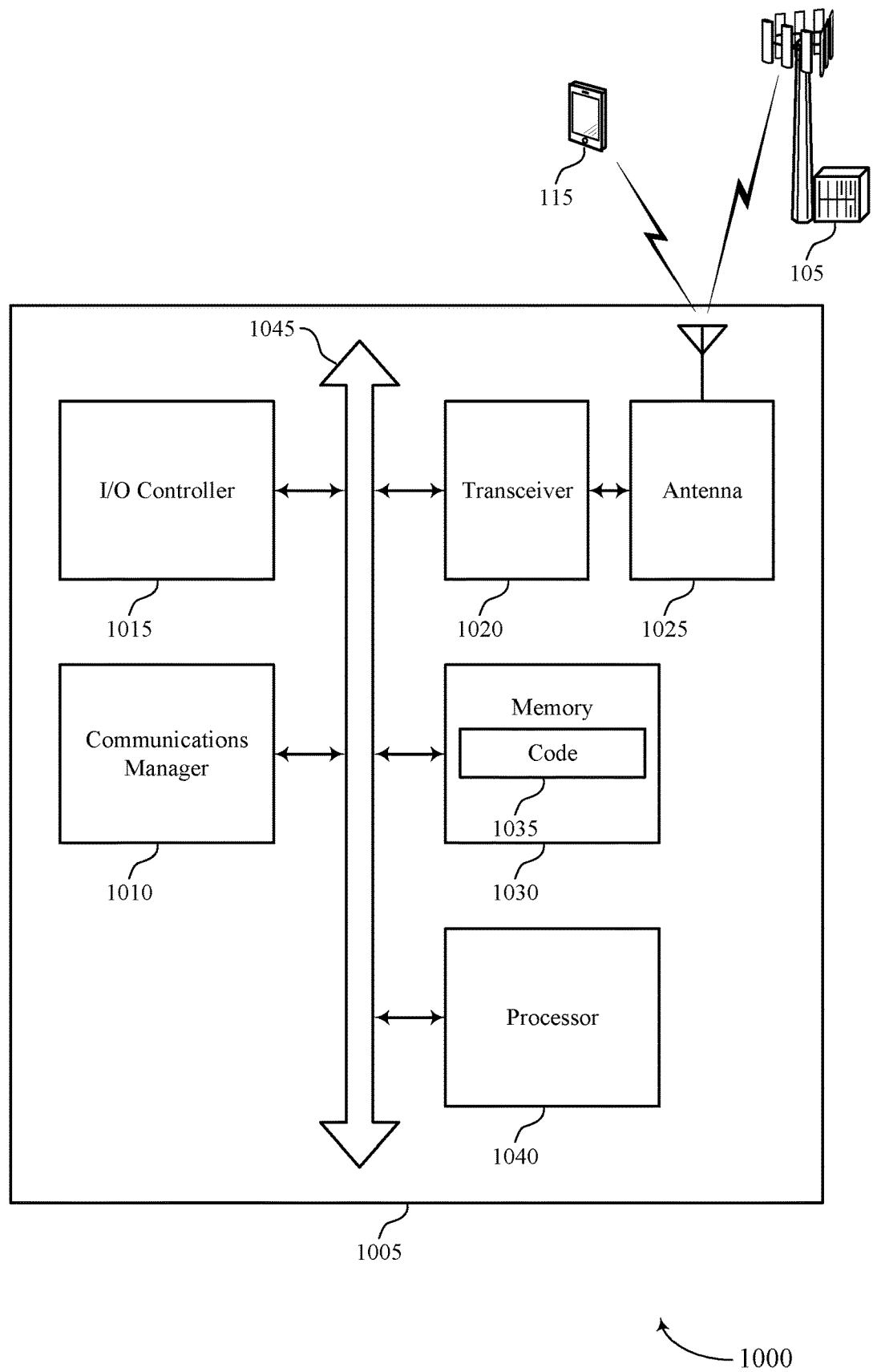
FIG. 10 shows a diagram of a system including a device that supports repetition techniques for autonomous uplink transmissions in accordance with aspects of the present disclosure.

FIG. 10 shows a diagram of a system 1000 including a device 1005 that supports repetition techniques for autonomous uplink transmissions in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently, transmit a first autonomous uplink transmission via the initial uplink resources, and retransmit the first autonomous uplink transmission via at least first retransmission resources in a first slot of the set of transmission slots.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting repetition techniques for autonomous uplink transmissions).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
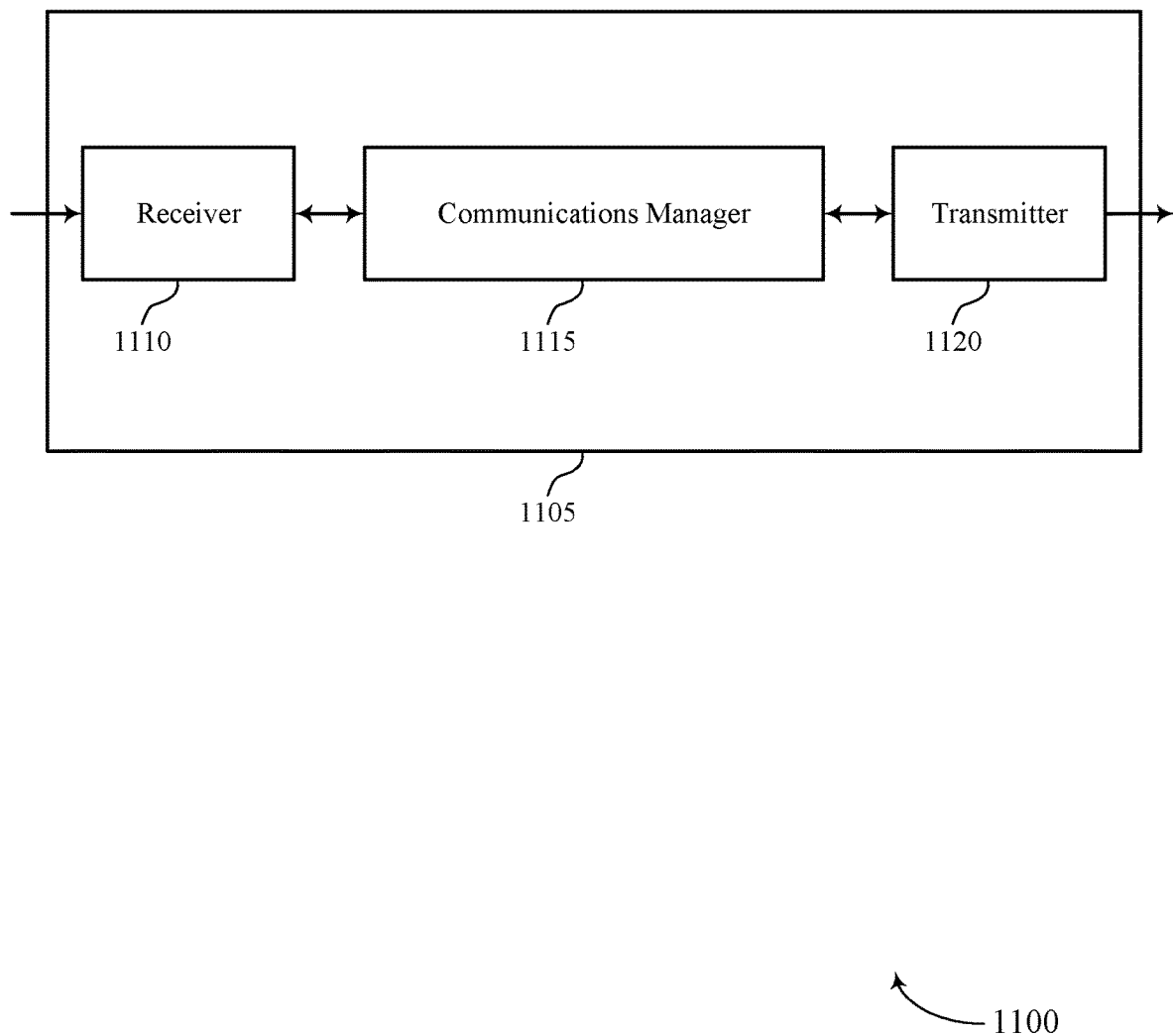
FIGS. 11 and 12 show block diagrams of devices that support repetition techniques for autonomous uplink transmissions in accordance with aspects of the present disclosure.

FIG. 11 shows a block diagram 1100 of a device 1105 that supports repetition techniques for autonomous uplink transmissions in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to repetition techniques for autonomous uplink transmissions, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receive a first autonomous uplink transmission from the first UE via the initial uplink resources, and receive at least a first retransmission of the first autonomous uplink transmission from the first UE via at least first retransmission resources in a first slot of the set of transmission slots. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
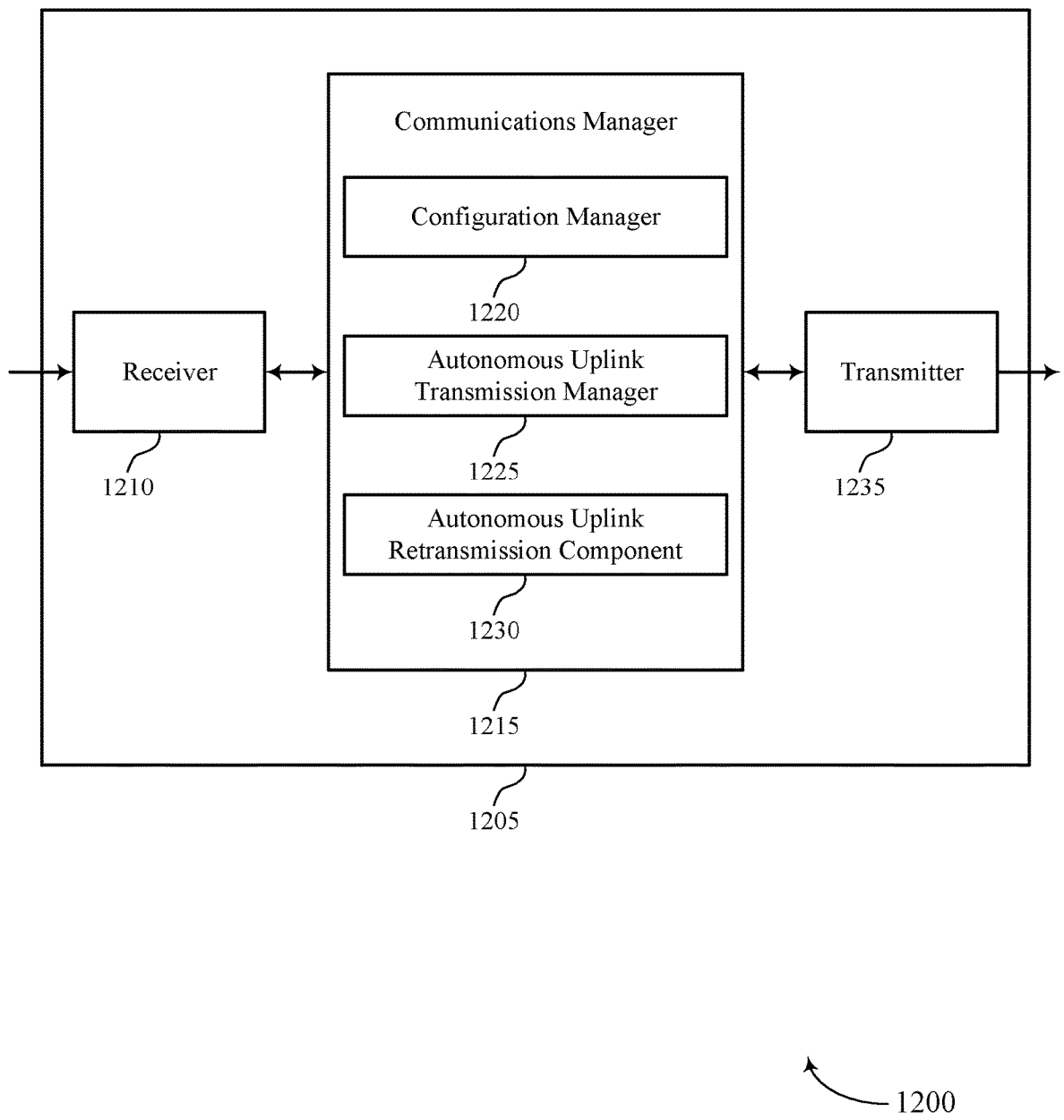

FIG. 12 shows a block diagram 1200 of a device 1205 that supports repetition techniques for autonomous uplink transmissions in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to repetition techniques for autonomous uplink transmissions, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, an autonomous uplink transmission manager 1225, and an autonomous uplink retransmission component 1230. The communications manager 1215 may be an example of aspects of the communications manager 1410 described herein.

The configuration manager 1220 may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently.

The autonomous uplink transmission manager 1225 may receive a first autonomous uplink transmission from the first UE via the initial uplink resources.

The autonomous uplink retransmission component 1230 may receive at least a first retransmission of the first autonomous uplink transmission from the first UE via at least first retransmission resources in a first slot of the set of transmission slots.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
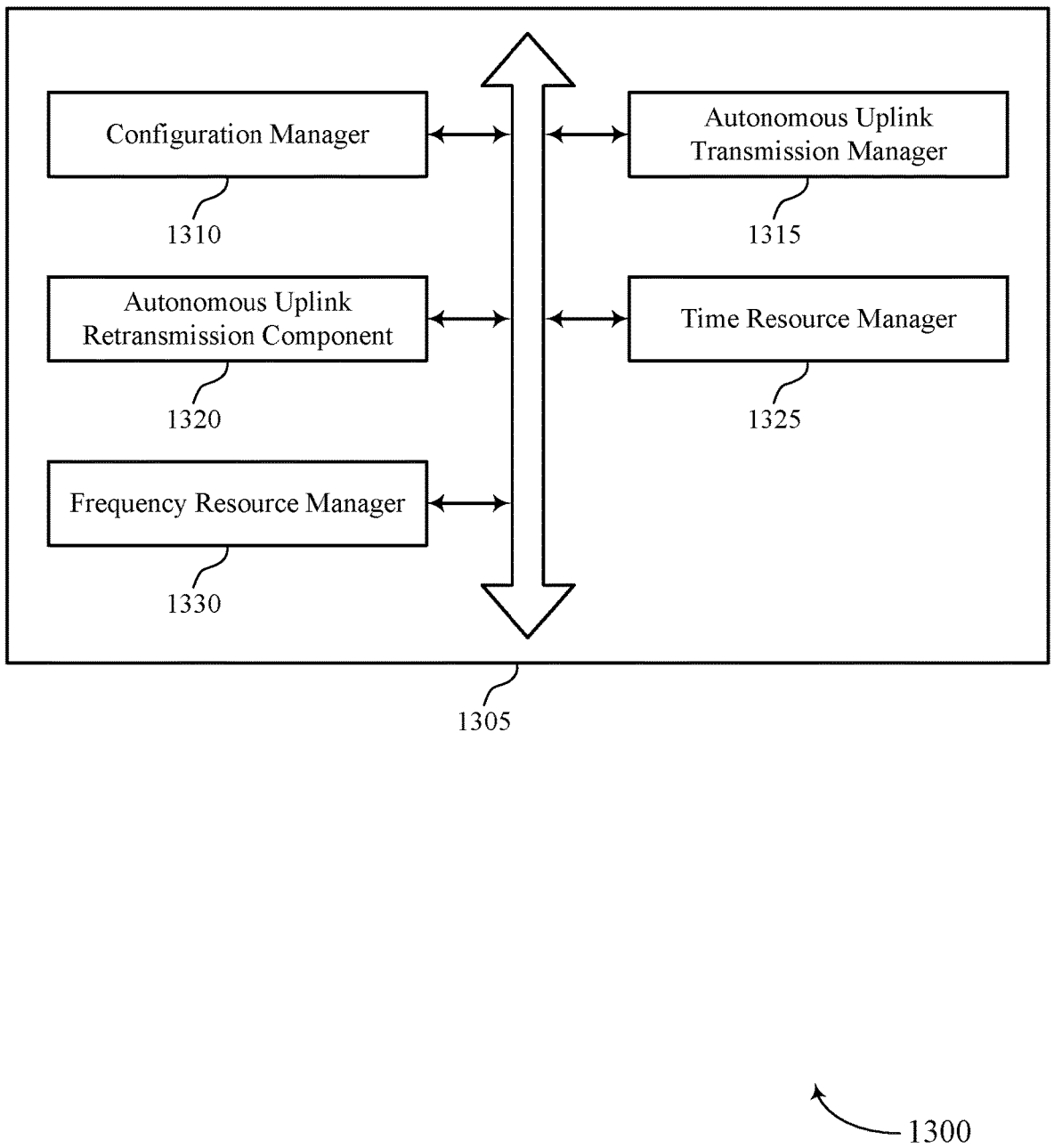
FIG. 13 shows a block diagram of a communications manager that supports repetition techniques for autonomous uplink transmissions in accordance with aspects of the present disclosure.

FIG. 13 shows a block diagram 1300 of a communications manager 1305 that supports repetition techniques for autonomous uplink transmissions in accordance with aspects of the present disclosure. The communications manager 1305 may be an example of aspects of a communications manager 1115, a communications manager 1215, or a communications manager 1410 described herein. The communications manager 1305 may include a configuration manager 1310, an autonomous uplink transmission manager 1315, an autonomous uplink retransmission component 1320, a time resource manager 1325, and a frequency resource manager 1330. Each of these modules may communicate, directly or indirectly, with one another (e.g., via one or more buses).

The configuration manager 1310 may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. In some examples, the configuration manager 1310 may configure the first UE with a first set of retransmission resources and the second UE with a second set of retransmission resources, where at least a portion of the first set of retransmission resources are non-overlapping in time with the second set of retransmission resources.

In some cases, the retransmission resources are configured in a first subset of slots that are uniformly spaced within the set of slots. In some cases, the first subset of slots include alternating slots within the set of slots. In some cases, the first subset of slots are configured in every Mth slot within the set of transmission slots, and where a value of M is provided in the configuration information. In some cases, the retransmission resources are configured in a first subset of slots that are distributed in a non-uniform pattern within the set of transmission slots, and where the configuration information indicates which slots of the set of transmission slots have retransmission resources. In some cases, the retransmission resources are non-overlapping with one or more configured uplink channels or downlink channels.

In some cases, the configuration information includes a time hopping offset that is used to repeatedly shift forward a starting symbol of time resources indicated by a start and length indicator value (SLIV) for each subsequent retransmission. In some cases, the configuration information includes a sequence of different time offsets that indicate a starting time resource for each successive retransmission. In some cases, the configuration information is transmitted via RRC signaling, DCI through a physical downlink control channel, a group common PDCCH transmission to a group of UEs, or any combinations thereof.

The autonomous uplink transmission manager 1315 may receive a first autonomous uplink transmission from the first UE via the initial uplink resources.

The autonomous uplink retransmission component 1320 may receive at least a first retransmission of the first autonomous uplink transmission from the first UE via at least first retransmission resources in a first slot of the set of transmission slots. In some examples, the autonomous uplink retransmission component 1320 may receive a second retransmission of the first autonomous uplink transmission from the first UE via second retransmission resources in a second slot of the set of transmission slots, where the first retransmission resources and the second retransmission resources occupy different time resources within the respective first slot and second slot. In some examples, the autonomous uplink retransmission component 1320 may receive a second retransmission of the first autonomous uplink transmission from the first UE via second retransmission resources in a second slot of the first subset of slots that is non-contiguous with the first slot.

In some examples, the autonomous uplink retransmission component 1320 may determine that the first autonomous transmission is successfully received at the base station. In some examples, the autonomous uplink retransmission component 1320 may transmit an early termination indication to the first UE. In some examples, the autonomous uplink retransmission component 1320 may discontinue attempts to receive further retransmissions of the first autonomous uplink transmission, based on the early termination indication.

The time resource manager 1325 may identify time resources for autonomous uplink transmissions. In some cases, the retransmission resources include a number of sets of time symbols within each slot of the set of transmission slots, and where retransmissions of each of the first UE and the second UE in different slots of the set of transmission slots use different sets of time symbols from the number of sets of time symbols. In some cases, the retransmission resources have a preconfigured pattern over the set of transmission slots, and where the configuration information indicates a first preconfigured pattern for the first UE and a second preconfigured pattern for the second UE.

The frequency resource manager 1330 may identify frequency resources for autonomous uplink transmissions. In some cases, the retransmission resources span a set of slots of the set of transmission slots, and where the first slot has a first set of frequency resources and a subsequent slot of the set of transmission slots has a second set of frequency resources that spans more frequency resources than the first set of frequency resources.

Figure 14:
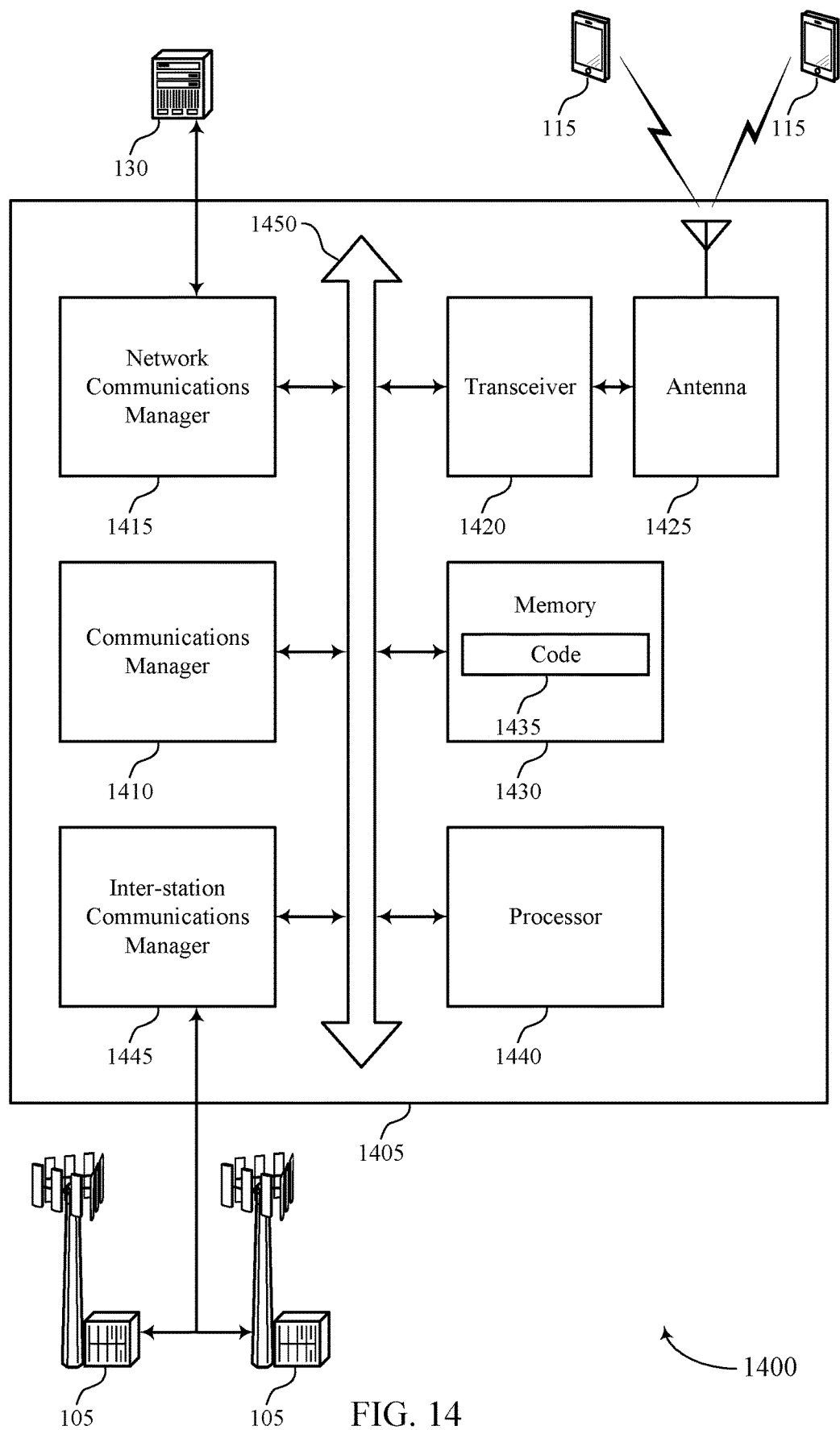
FIG. 14 shows a diagram of a system including a device that supports repetition techniques for autonomous uplink transmissions in accordance with aspects of the present disclosure.

FIG. 14 shows a diagram of a system 1400 including a device 1405 that supports repetition techniques for autonomous uplink transmissions in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently, receive a first autonomous uplink transmission from the first UE via the initial uplink resources, and receive at least a first retransmission of the first autonomous uplink transmission from the first UE via at least first retransmission resources in a first slot of the set of transmission slots.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device to perform various functions (e.g., functions or tasks supporting repetition techniques for autonomous uplink transmissions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
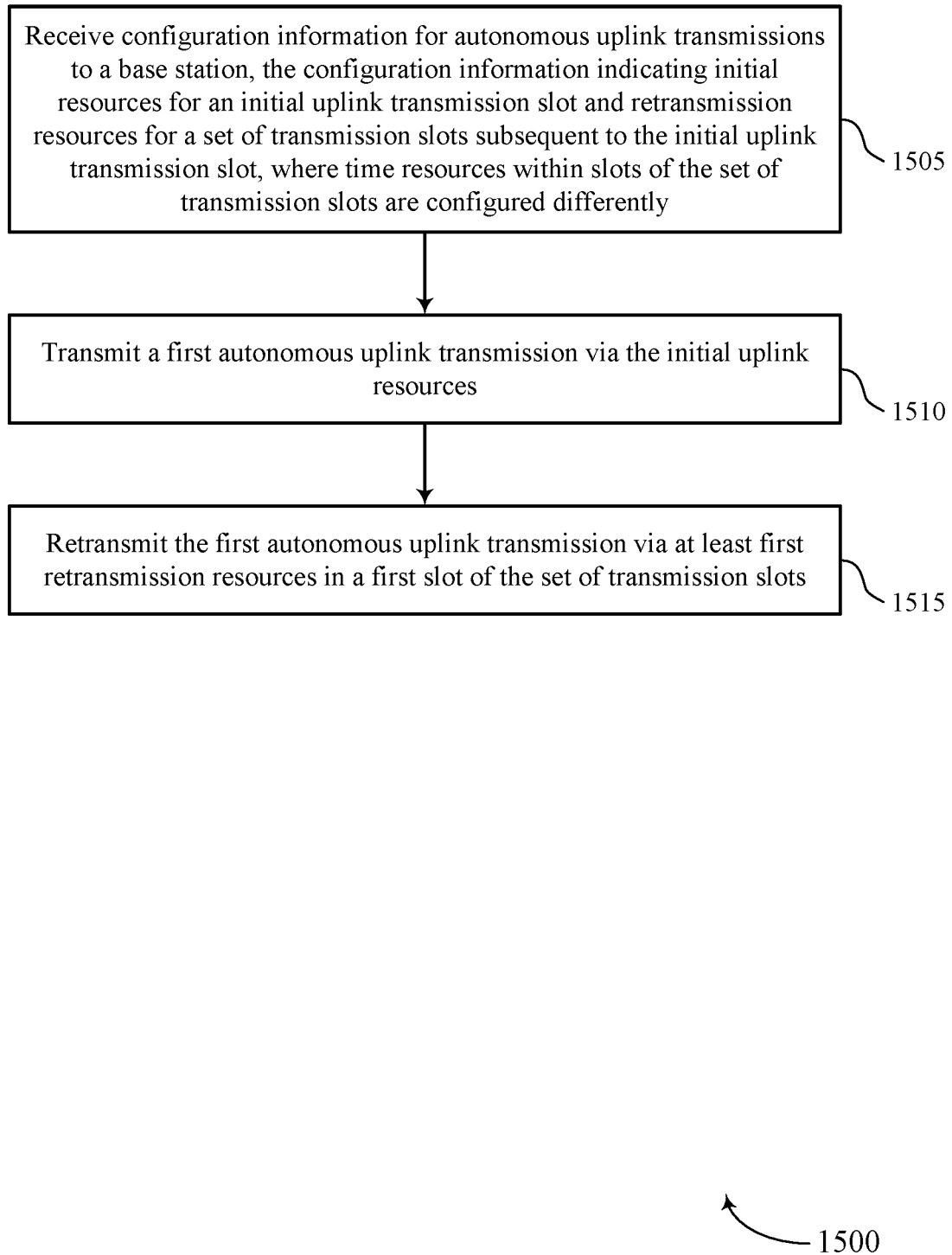
FIGS. 15 through 23 show flowcharts illustrating methods that support repetition techniques for autonomous uplink transmissions in accordance with aspects of the present disclosure.

FIG. 15 shows a flowchart illustrating a method 1500 that supports repetition techniques for autonomous uplink transmissions in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently. The operations of 1505 may be performed according to the methods described herein. In some examples, aspects of the operations of 1505 may be performed by a configuration manager as described with reference to FIGS. 7 through 10.

At 1510, the UE may transmit a first autonomous uplink transmission via the initial uplink resources. The operations of 1510 may be performed according to the methods described herein. In some examples, aspects of the operations of 1510 may be performed by an autonomous uplink transmission manager as described with reference to FIGS. 7 through 10.

At 1515, the UE may retransmit the first autonomous uplink transmission via at least first retransmission resources in a first slot of the set of transmission slots. The operations of 1515 may be performed according to the methods described herein. In some examples, aspects of the operations of 1515 may be performed by an autonomous uplink retransmission component as described with reference to FIGS. 7 through 10. In some cases, the UE may retransmit the first autonomous uplink transmission via second retransmission resources in a second slot of the first subset of slots that is non-contiguous with the first slot. In some cases, the retransmission resources are configured in a first subset of slots that are uniformly spaced within the set of slots. In some cases, the first subset of slots include alternating slots within the set of slots, or in every Mth slot within the set of transmission slots, and where a value of M is provided in the configuration information. In other cases, the retransmission resources are configured in a first subset of slots that are distributed in a non-uniform pattern within the set of transmission slots, and where the configuration information indicates which slots of the set of transmission slots have retransmission resources.

In some cases, the retransmission resources are non-overlapping with one or more configured uplink channels or downlink channels. In some cases, the retransmission resources include a plurality of sets of time symbols within each slot of the set of transmission slots, and where retransmissions in different slots of the set of transmission slots use different sets of time symbols from the plurality of sets of time symbols. In some cases, the retransmission resources have a preconfigured pattern over the set of transmission slots, and where the configuration information indicates which of a set of preconfigured patterns is to be used by the UE.

Figure 16:
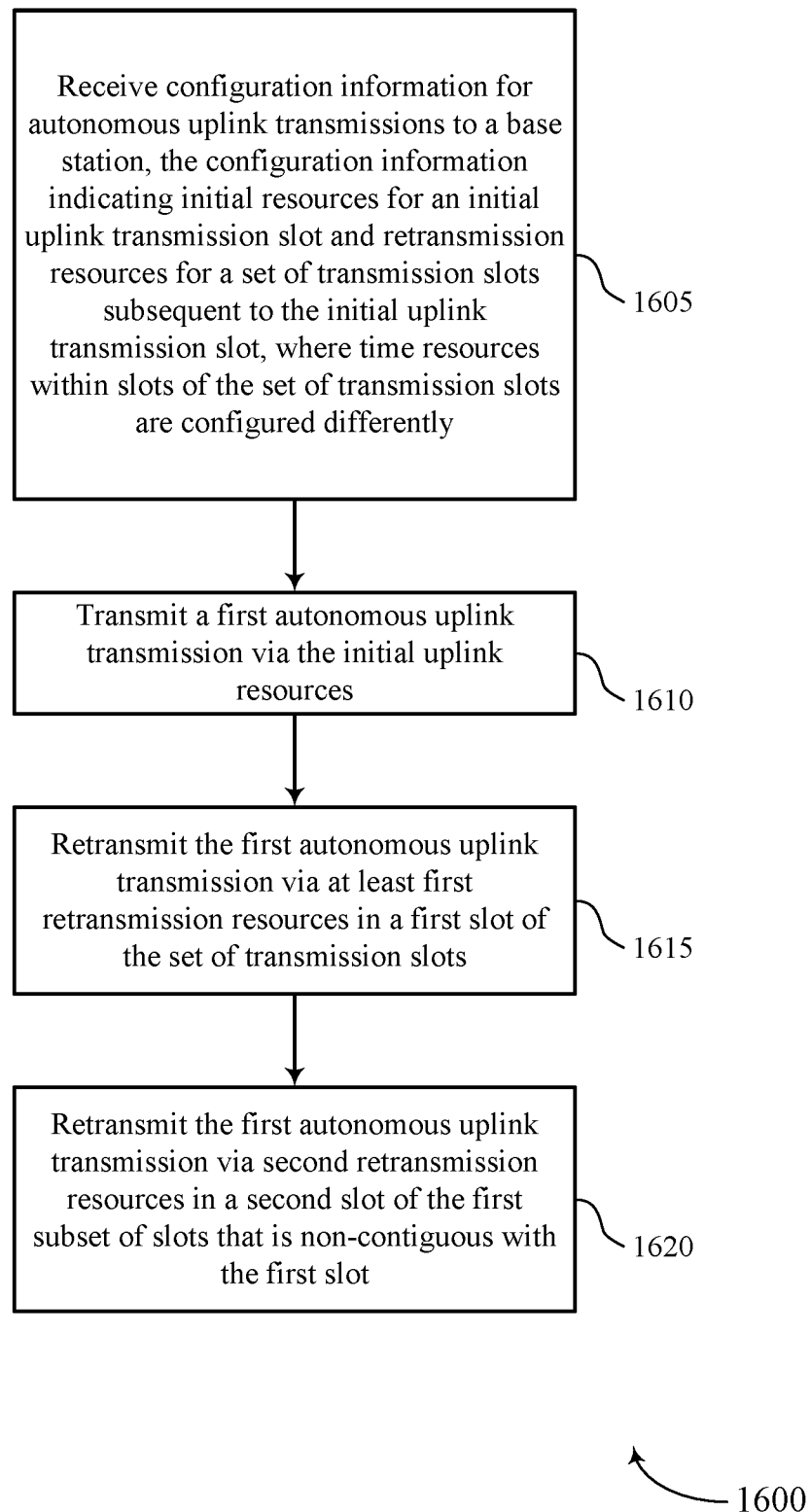

FIG. 16 shows a flowchart illustrating a method 1600 that supports repetition techniques for autonomous uplink transmissions in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently. The operations of 1605 may be performed according to the methods described herein. In some examples, aspects of the operations of 1605 may be performed by a configuration manager as described with reference to FIGS. 7 through 10.

At 1610, the UE may transmit a first autonomous uplink transmission via the initial uplink resources. The operations of 1610 may be performed according to the methods described herein. In some examples, aspects of the operations of 1610 may be performed by an autonomous uplink transmission manager as described with reference to FIGS. 7 through 10.

At 1615, the UE may retransmit the first autonomous uplink transmission via at least first retransmission resources in a first slot of the set of transmission slots. The operations of 1615 may be performed according to the methods described herein. In some examples, aspects of the operations of 1615 may be performed by an autonomous uplink retransmission component as described with reference to FIGS. 7 through 10.

At 1620, the UE may retransmit the first autonomous uplink transmission via second retransmission resources in a second slot of the first subset of slots that is non-contiguous with the first slot. The operations of 1620 may be performed according to the methods described herein. In some examples, aspects of the operations of 1620 may be performed by an autonomous uplink retransmission component as described with reference to FIGS. 7 through 10.

Figure 17:
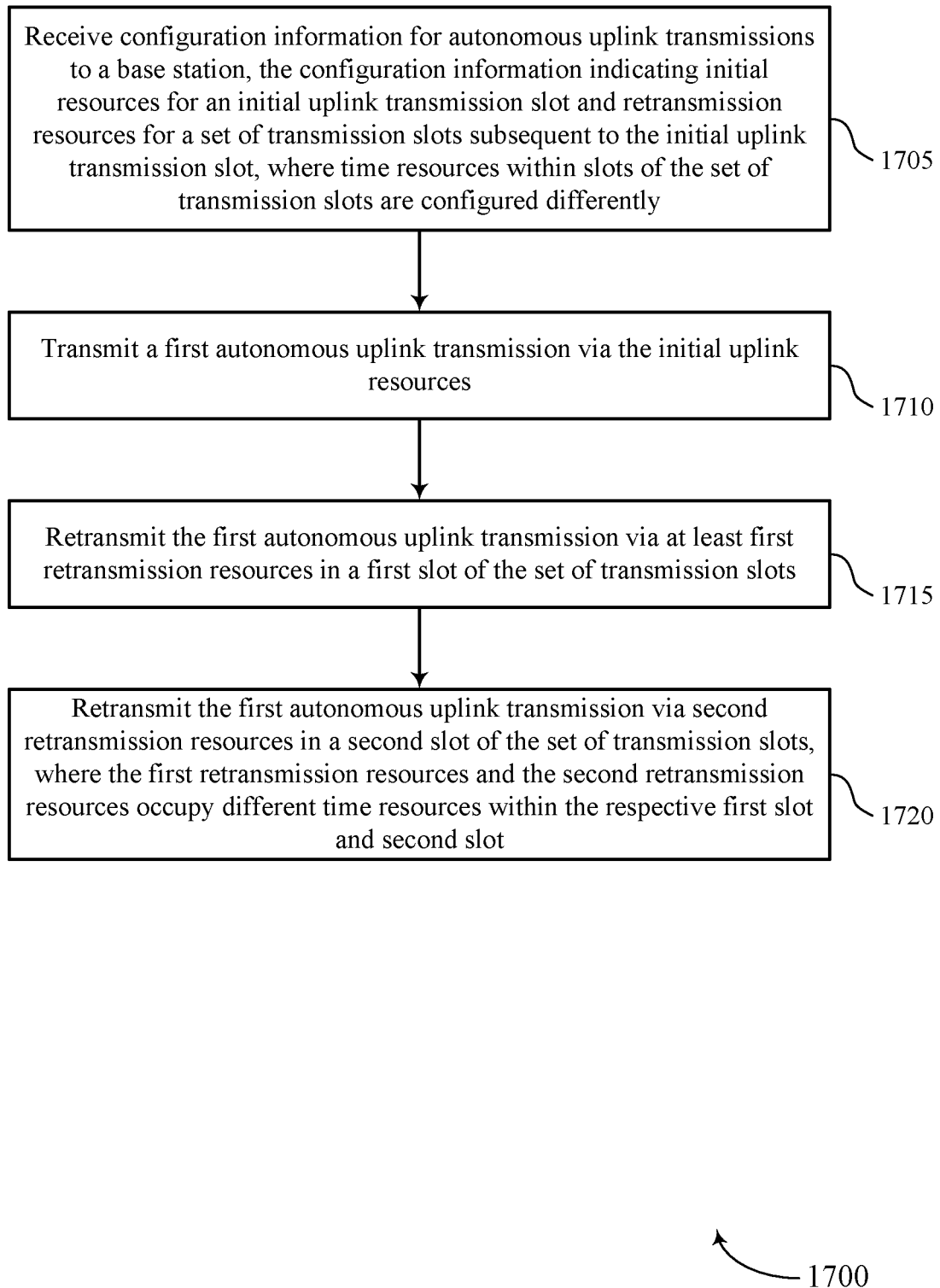

FIG. 17 shows a flowchart illustrating a method 1700 that supports repetition techniques for autonomous uplink transmissions in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently. The operations of 1705 may be performed according to the methods described herein. In some examples, aspects of the operations of 1705 may be performed by a configuration manager as described with reference to FIGS. 7 through 10.

At 1710, the UE may transmit a first autonomous uplink transmission via the initial uplink resources. The operations of 1710 may be performed according to the methods described herein. In some examples, aspects of the operations of 1710 may be performed by an autonomous uplink transmission manager as described with reference to FIGS. 7 through 10.

At 1715, the UE may retransmit the first autonomous uplink transmission via at least first retransmission resources in a first slot of the set of transmission slots. The operations of 1715 may be performed according to the methods described herein. In some examples, aspects of the operations of 1715 may be performed by an autonomous uplink retransmission component as described with reference to FIGS. 7 through 10.

At 1720, the UE may retransmit the first autonomous uplink transmission via second retransmission resources in a second slot of the set of transmission slots, where the first retransmission resources and the second retransmission resources occupy different time resources within the respective first slot and second slot. The operations of 1720 may be performed according to the methods described herein. In some examples, aspects of the operations of 1720 may be performed by an autonomous uplink retransmission component as described with reference to FIGS. 7 through 10. In some cases, the first retransmission resources occupy a first set of symbols and the second retransmission resources occupy a second set of symbols, and where the first set of symbols are non-overlapping with the second set of symbols.

Figure 18:
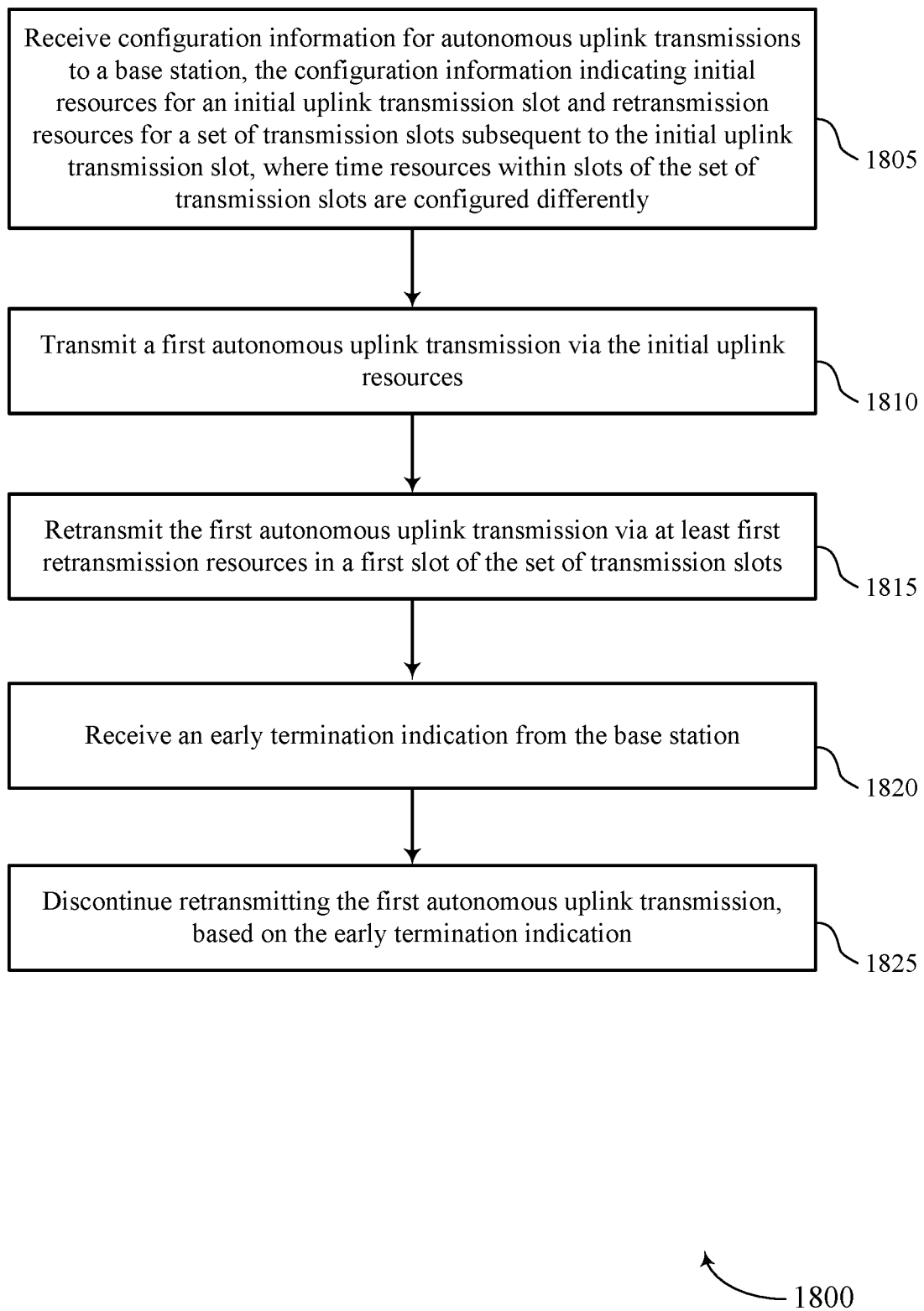

FIG. 18 shows a flowchart illustrating a method 1800 that supports repetition techniques for autonomous uplink transmissions in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive configuration information for autonomous uplink transmissions to a base station, the configuration information indicating initial resources for an initial uplink transmission slot and retransmission resources for a set of transmission slots subsequent to the initial uplink transmission slot, where time resources within slots of the set of transmission slots are configured differently. The operations of 1805 may be performed according to the methods described herein. In some examples, aspects of the operations of 1805 may be performed by a configuration manager as described with reference to FIGS. 7 through 10.

At 1810, the UE may transmit a first autonomous uplink transmission via the initial uplink resources. The operations of 1810 may be performed according to the methods described herein. In some examples, aspects of the operations of 1810 may be performed by an autonomous uplink transmission manager as described with reference to FIGS. 7 through 10.

At 1815, the UE may retransmit the first autonomous uplink transmission via at least first retransmission resources in a first slot of the set of transmission slots. The operations of 1815 may be performed according to the methods described herein. In some examples, aspects of the operations of 1815 may be performed by an autonomous uplink retransmission component as described with reference to FIGS. 7 through 10.

At 1820, the UE may receive an early termination indication from the base station. The operations of 1820 may be performed according to the methods described herein. In some examples, aspects of the operations of 1820 may be performed by an autonomous uplink retransmission component as described with reference to FIGS. 7 through 10.

At 1825, the UE may discontinue retransmitting the first autonomous uplink transmission, based on the early termination indication. The operations of 1825 may be performed according to the methods described herein. In some examples, aspects of the operations of 1825 may be performed by an autonomous uplink retransmission component as described with reference to FIGS. 7 through 10.

Figure 19:
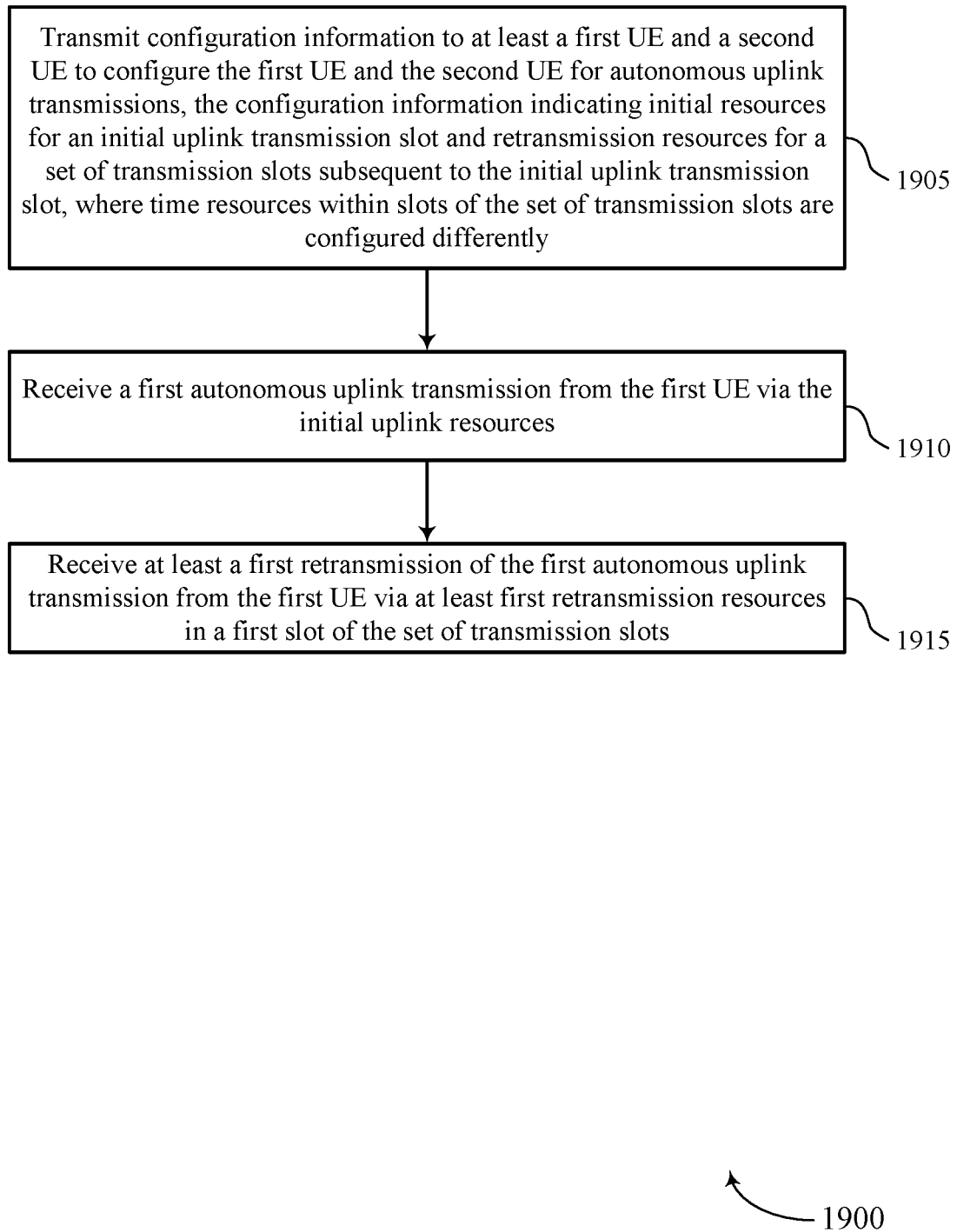

FIG. 19 shows a flowchart illustrating a method 1900 that supports repetition techniques for autonomous uplink transmissions in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. The operations of 1905 may be performed according to the methods described herein. In some examples, aspects of the operations of 1905 may be performed by a configuration manager as described with reference to FIGS. 11 through 14.

At 1910, the base station may receive a first autonomous uplink transmission from the first UE via the initial uplink resources. The operations of 1910 may be performed according to the methods described herein. In some examples, aspects of the operations of 1910 may be performed by an autonomous uplink transmission manager as described with reference to FIGS. 11 through 14.

At 1915, the base station may receive at least a first retransmission of the first autonomous uplink transmission from the first UE via at least first retransmission resources in a first slot of the set of transmission slots. The operations of 1915 may be performed according to the methods described herein. In some examples, aspects of the operations of 1915 may be performed by an autonomous uplink retransmission component as described with reference to FIGS. 11 through 14. In some cases, the base station may receive a second retransmission of the first autonomous uplink transmission from the first UE via second retransmission resources in a second slot of the first subset of slots that is non-contiguous with the first slot. In some cases, the retransmission resources are configured in a first subset of slots that are uniformly spaced within the set of slots, such as in alternating slots or in every Mth slot within the set of transmission slots.

In some cases, the retransmission resources are configured in a first subset of slots that are distributed in a non-uniform pattern within the set of transmission slots, and where the configuration information indicates which slots of the set of transmission slots have retransmission resources. In some cases, the retransmission resources are non-overlapping with one or more configured uplink channels or downlink channels.

Figure 20:
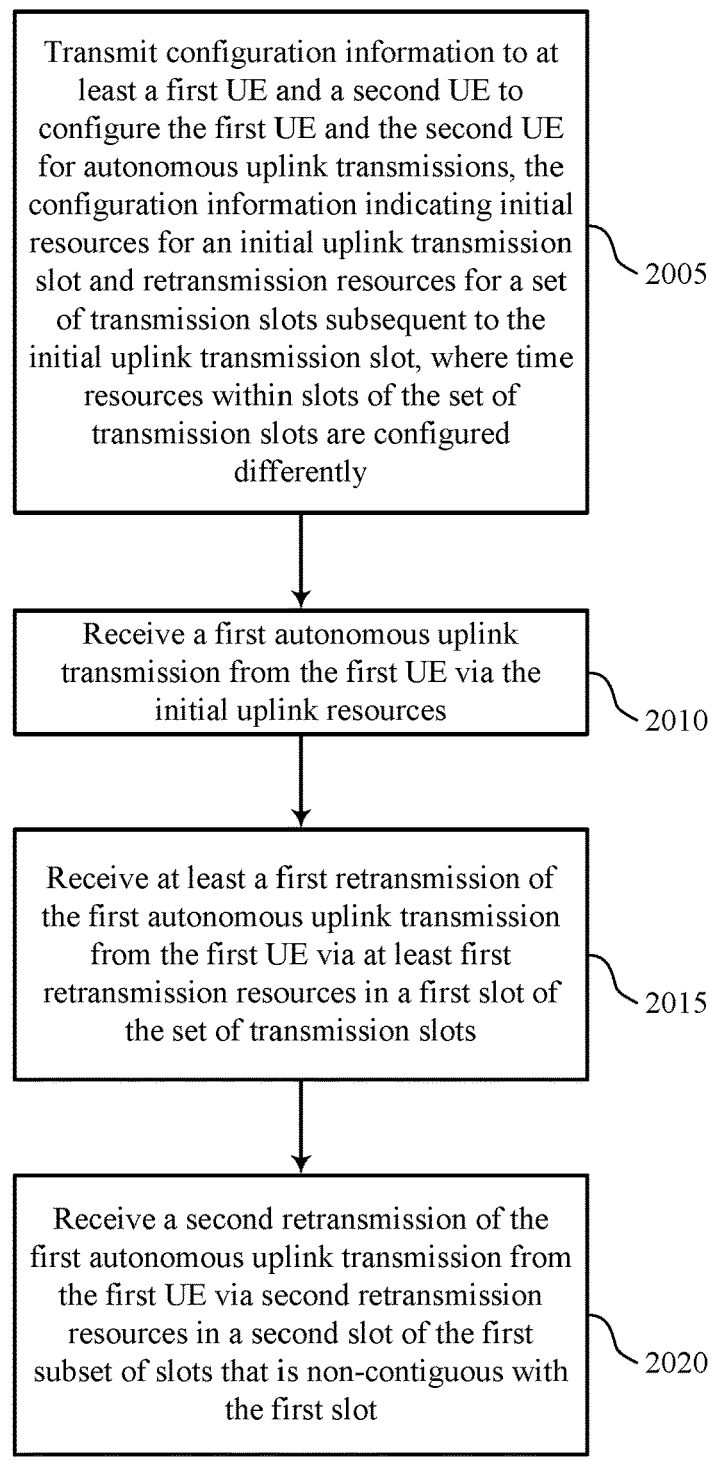

FIG. 20 shows a flowchart illustrating a method 2000 that supports repetition techniques for autonomous uplink transmissions in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. The operations of 2005 may be performed according to the methods described herein. In some examples, aspects of the operations of 2005 may be performed by a configuration manager as described with reference to FIGS. 11 through 14.

At 2010, the base station may receive a first autonomous uplink transmission from the first UE via the initial uplink resources. The operations of 2010 may be performed according to the methods described herein. In some examples, aspects of the operations of 2010 may be performed by an autonomous uplink transmission manager as described with reference to FIGS. 11 through 14.

At 2015, the base station may receive at least a first retransmission of the first autonomous uplink transmission from the first UE via at least first retransmission resources in a first slot of the set of transmission slots. The operations of 2015 may be performed according to the methods described herein. In some examples, aspects of the operations of 2015 may be performed by an autonomous uplink retransmission component as described with reference to FIGS. 11 through 14.

At 2020, the base station may receive a second retransmission of the first autonomous uplink transmission from the first UE via second retransmission resources in a second slot of the first subset of slots that is non-contiguous with the first slot. The operations of 2020 may be performed according to the methods described herein. In some examples, aspects of the operations of 2020 may be performed by an autonomous uplink retransmission component as described with reference to FIGS. 11 through 14.

Figure 21:
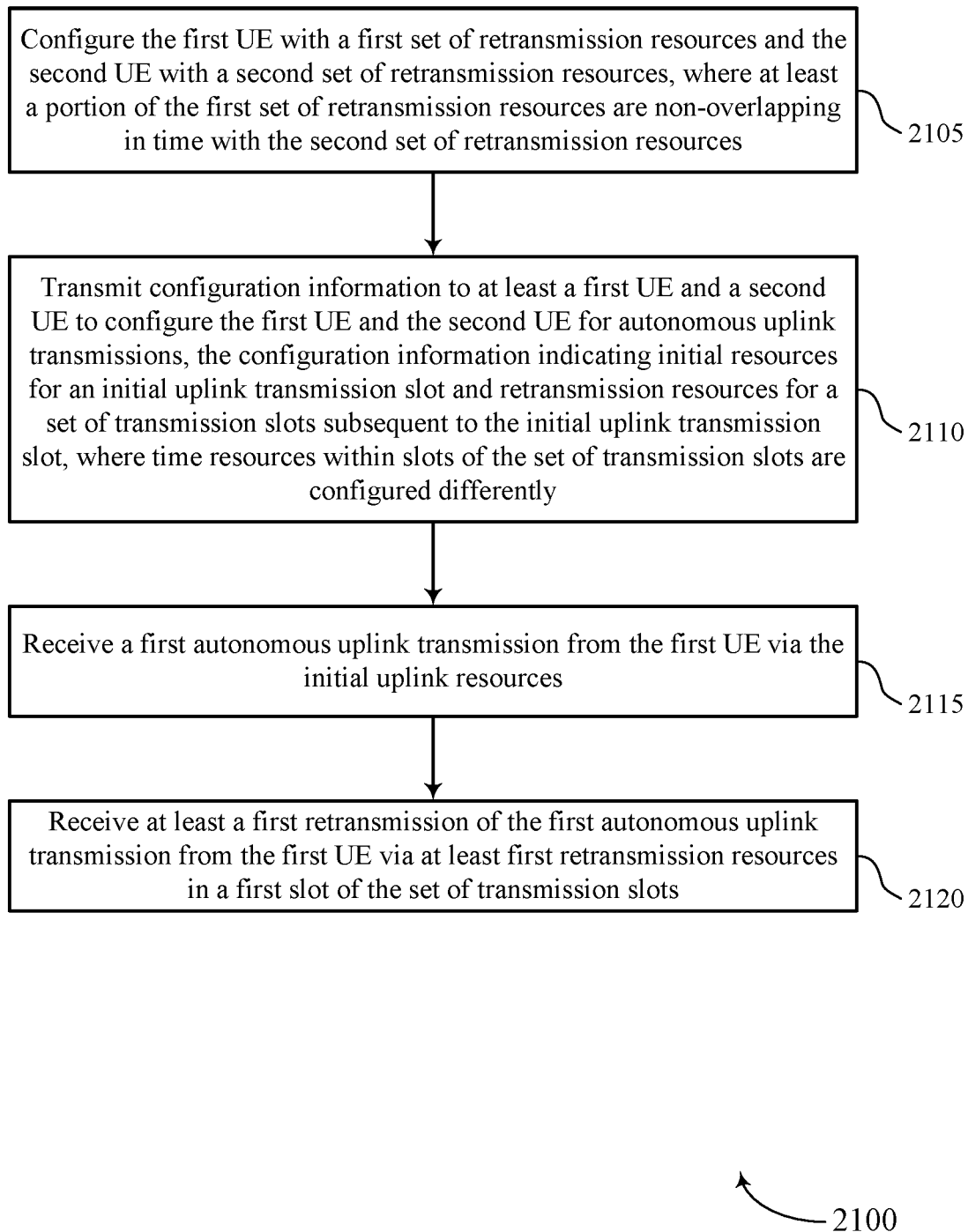

FIG. 21 shows a flowchart illustrating a method 2100 that supports repetition techniques for autonomous uplink transmissions in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may configure the first UE with a first set of retransmission resources and the second UE with a second set of retransmission resources, where at least a portion of the first set of retransmission resources are non-overlapping in time with the second set of retransmission resources. The operations of 2105 may be performed according to the methods described herein. In some examples, aspects of the operations of 2105 may be performed by a configuration manager as described with reference to FIGS. 11 through 14.

At 2110, the base station may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. The operations of 2110 may be performed according to the methods described herein. In some examples, aspects of the operations of 2110 may be performed by a configuration manager as described with reference to FIGS. 11 through 14.

At 2115, the base station may receive a first autonomous uplink transmission from the first UE via the initial uplink resources. The operations of 2115 may be performed according to the methods described herein. In some examples, aspects of the operations of 2115 may be performed by an autonomous uplink transmission manager as described with reference to FIGS. 11 through 14.

At 2120, the base station may receive at least a first retransmission of the first autonomous uplink transmission from the first UE via at least first retransmission resources in a first slot of the set of transmission slots. The operations of 2120 may be performed according to the methods described herein. In some examples, aspects of the operations of 2120 may be performed by an autonomous uplink retransmission component as described with reference to FIGS. 11 through 14.

Figure 22:
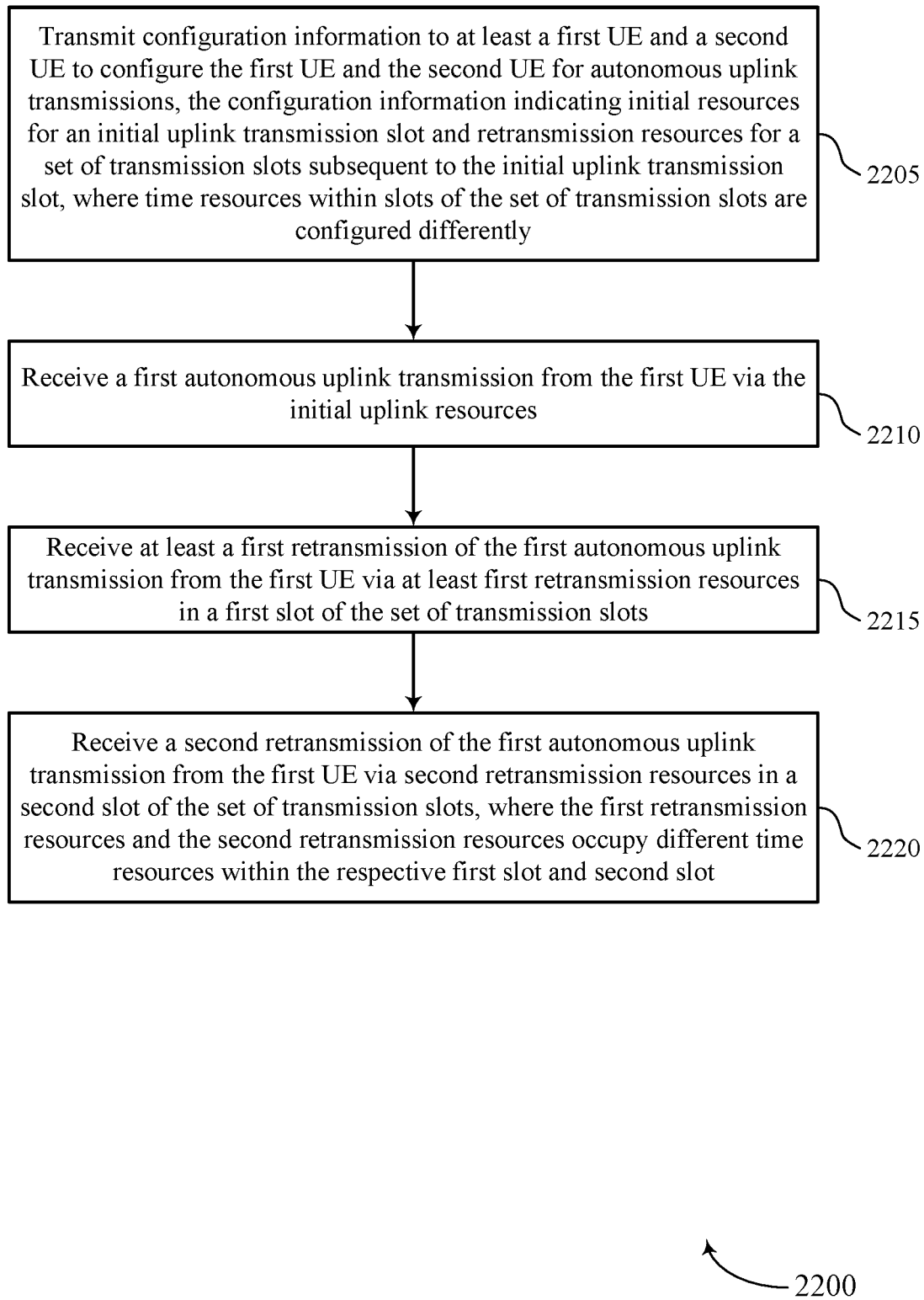

FIG. 22 shows a flowchart illustrating a method 2200 that supports repetition techniques for autonomous uplink transmissions in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. The operations of 2205 may be performed according to the methods described herein. In some examples, aspects of the operations of 2205 may be performed by a configuration manager as described with reference to FIGS. 11 through 14.

At 2210, the base station may receive a first autonomous uplink transmission from the first UE via the initial uplink resources. The operations of 2210 may be performed according to the methods described herein. In some examples, aspects of the operations of 2210 may be performed by an autonomous uplink transmission manager as described with reference to FIGS. 11 through 14.

At 2215, the base station may receive at least a first retransmission of the first autonomous uplink transmission from the first UE via at least first retransmission resources in a first slot of the set of transmission slots. The operations of 2215 may be performed according to the methods described herein. In some examples, aspects of the operations of 2215 may be performed by an autonomous uplink retransmission component as described with reference to FIGS. 11 through 14.

At 2220, the base station may receive a second retransmission of the first autonomous uplink transmission from the first UE via second retransmission resources in a second slot of the set of transmission slots, where the first retransmission resources and the second retransmission resources occupy different time resources within the respective first slot and second slot. The operations of 2220 may be performed according to the methods described herein. In some examples, aspects of the operations of 2220 may be performed by an autonomous uplink retransmission component as described with reference to FIGS. 11 through 14.

Figure 23:
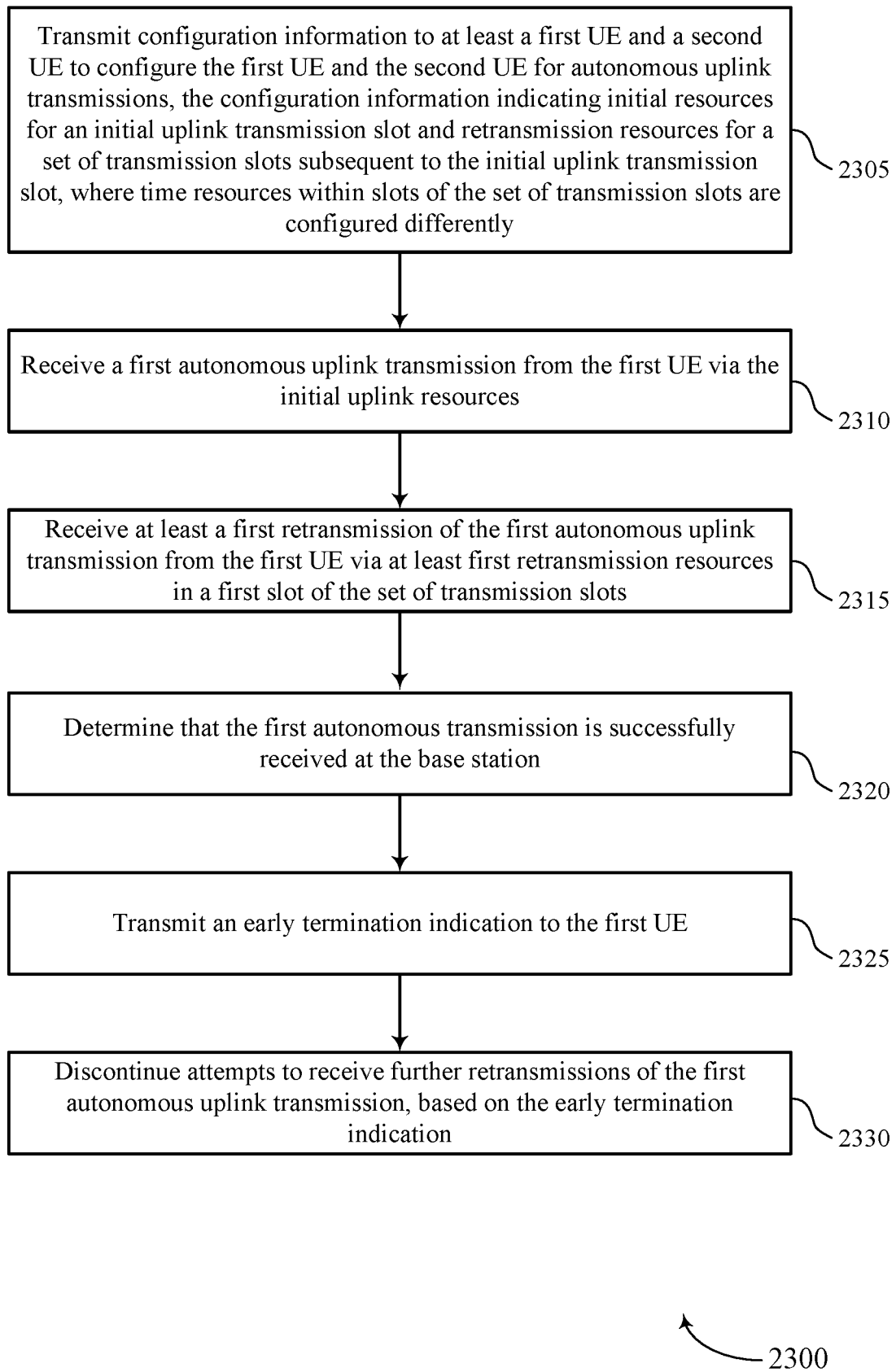

FIG. 23 shows a flowchart illustrating a method 2300 that supports repetition techniques for autonomous uplink transmissions in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may transmit configuration information to at least a first UE and a second UE to configure the first UE and the second UE for autonomous uplink transmissions, the configuration information indicating initial resources for an initial uplink transmission slot and retransmission resources for a set of transmission slots subsequent to the initial uplink transmission slot, where time resources within slots of the set of transmission slots are configured differently. The operations of 2305 may be performed according to the methods described herein. In some examples, aspects of the operations of 2305 may be performed by a configuration manager as described with reference to FIGS. 11 through 14.

At 2310, the base station may receive a first autonomous uplink transmission from the first UE via the initial uplink resources. The operations of 2310 may be performed according to the methods described herein. In some examples, aspects of the operations of 2310 may be performed by an autonomous uplink transmission manager as described with reference to FIGS. 11 through 14.

At 2315, the base station may receive at least a first retransmission of the first autonomous uplink transmission from the first UE via at least first retransmission resources in a first slot of the set of transmission slots. The operations of 2315 may be performed according to the methods described herein. In some examples, aspects of the operations of 2315 may be performed by an autonomous uplink retransmission component as described with reference to FIGS. 11 through 14.

At 2320, the base station may determine that the first autonomous transmission is successfully received at the base station. The operations of 2320 may be performed according to the methods described herein. In some examples, aspects of the operations of 2320 may be performed by an autonomous uplink retransmission component as described with reference to FIGS. 11 through 14.

At 2325, the base station may transmit an early termination indication to the first UE. The operations of 2325 may be performed according to the methods described herein. In some examples, aspects of the operations of 2325 may be performed by an autonomous uplink retransmission component as described with reference to FIGS. 11 through 14.

At 2330, the base station may discontinue attempts to receive further retransmissions of the first autonomous uplink transmission, based on the early termination indication. The operations of 2330 may be performed according to the methods described herein. In some examples, aspects of the operations of 2330 may be performed by an autonomous uplink retransmission component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving configuration information for autonomous uplink transmissions to a base station, the configuration information indicating initial resources for an initial uplink transmission slot and retransmission resources for a set of transmission slots subsequent to the initial uplink transmission slot, wherein time resources within slots of the set of transmission slots are configured differently, and the retransmission resources comprise a plurality of sets of time symbols within each slot of the set of transmission slots, and wherein retransmissions in different slots of the set of transmission slots use different sets of time symbols from the plurality of sets of time symbols;
   transmitting a first autonomous uplink transmission via the initial uplink resources; and retransmitting the first autonomous uplink transmission via at least first retransmission resources in a first slot of the set of transmission slots.

2. The method of claim 1, wherein the retransmission resources are configured in a first subset of slots that are distributed in a non-uniform pattern within the set of transmission slots, and wherein the configuration information indicates which slots of the set of transmission slots have retransmission resources.

3. The method of claim 2, wherein the retransmission resources are non-overlapping with one or more configured uplink channels or downlink channels.

4. The method of claim 1, wherein the retransmitting further comprises:
retransmitting the first autonomous uplink transmission via second retransmission resources in a second slot of the set of transmission slots, wherein the first retransmission resources and the second retransmission resources occupy different time resources within the respective first slot and second slot.

5. The method of claim 1, wherein the retransmission resources have a preconfigured pattern over the set of transmission slots, and wherein the configuration information indicates one or more of:
which of a plurality of preconfigured patterns is to be used by the UE, or
a length of an allocation for each retransmission, and wherein the length of the allocation is based on which of the plurality of sets of time symbols is used for a retransmission.

6. The method of claim 1, wherein the retransmitting further comprises:
retransmitting the first autonomous uplink transmission via second retransmission resources in a second slot of a first subset of slots that is non-contiguous with the first slot.

7. The method of claim 6, wherein the first subset of slots are configured in every Mth slot within the set of transmission slots, and wherein a value of M is provided in the configuration information.

8. The method of claim 1, wherein the retransmission resources span a plurality of slots of the set of transmission slots, and wherein the first slot has a first set of frequency resources and a subsequent slot of the set of transmission slots has a second set of frequency resources that spans a different number of frequency resources than the first set of frequency resources.

9. The method of claim 1, further comprising:
receiving an early termination indication from the base station; and
discontinuing retransmitting the first autonomous uplink transmission, based at least in part on the early termination indication.

10. The method of claim 1, wherein the receiving the configuration information comprises one or more of:
receiving a time hopping offset that is used to repeatedly shift forward a starting symbol of time resources indicated by a start and length indicator value (SLIV) for each subsequent retransmission; or
receiving a sequence of different time offsets that indicate a starting time resource for each successive retransmission.

11. The method of claim 1, wherein the configuration information is received via radio resource control (RRC) signaling, downlink control information (DCI) through a physical downlink control channel, a group common PDCCH transmission, or any combinations thereof.

12. A method for wireless communications at a base station, comprising:
transmitting configuration information to at least a first user equipment (UE) and a second UE to configure the first UE and the second UE for autonomous uplink transmissions, the configuration information indicating initial resources for an initial uplink transmission slot and retransmission resources for a set of transmission slots subsequent to the initial uplink transmission slot, wherein time resources within slots of the set of transmission slots are configured differently, and the retransmission resources comprise a plurality of sets of time symbols within each slot of the set of transmission slots, and wherein retransmissions of each of the first UE and the second UE in different slots of the set of transmission slots use different sets of time symbols from the plurality of sets of time symbols;
receiving a first autonomous uplink transmission from the first UE via the initial uplink resources; and
receiving at least a first retransmission of the first autonomous uplink transmission from the first UE via at least first retransmission resources in a first slot of the set of transmission slots.

13. The method of claim 12, further comprising:
configuring the first UE with a first set of retransmission resources and the second UE with a second set of retransmission resources, wherein at least a portion of the first set of retransmission resources are non-overlapping in time with the second set of retransmission resources.

14. The method of claim 12, wherein the receiving at least the first retransmission further comprises:
receiving a second retransmission of the first autonomous uplink transmission from the first UE via second retransmission resources in a second slot of the set of transmission slots, wherein the first retransmission resources and the second retransmission resources occupy different time resources within the respective first slot and second slot.

15. The method of claim 12, wherein the receiving at least the first retransmission further comprises:
receiving a second retransmission of the first autonomous uplink transmission from the first UE via second retransmission resources in a second slot of a first subset of slots that is non-contiguous with the first slot.

16. The method of claim 15, wherein the first subset of slots are configured in every Mth slot within the set of transmission slots, and wherein a value of M is provided in the configuration information.

17. The method of claim 12, wherein the retransmission resources are configured in a first subset of slots that are distributed in a non-uniform pattern within the set of transmission slots, and wherein the configuration information indicates which slots of the set of transmission slots have retransmission resources.

18. The method of claim 17, wherein the retransmission resources are non-overlapping with one or more configured uplink channels or downlink channels.

19. The method of claim 12, wherein the retransmission resources have a preconfigured pattern over the set of transmission slots, and wherein the configuration information indicates a first preconfigured pattern for the first UE and a second preconfigured pattern for the second UE.

20. The method of claim 12, wherein the retransmission resources span a plurality of slots of the set of transmission slots, and wherein the first slot has a first set of frequency resources and a subsequent slot of the set of transmission slots has a second set of frequency resources that spans more frequency resources than the first set of frequency resources.

21. The method of claim 12, further comprising:
determining that the first autonomous transmission is successfully received at the base station;
transmitting an early termination indication to the first UE; and
discontinuing attempts to receive further retransmissions of the first autonomous uplink transmission, based at least in part on the early termination indication.

22. The method of claim 12, wherein the configuration information comprises one or more of:
a time hopping offset that is used to repeatedly shift forward a starting symbol of time resources indicated by a start and length indicator value (SLIV) for each subsequent retransmission; or
a sequence of different time offsets that indicate a starting time resource for each successive retransmission.

23. An apparatus for wireless communications at a user equipment (UE), comprising: a processor, memory in electronic communication with the processor; and instructions stored in the memory and executable by the processor to cause the apparatus to:
receive configuration information for autonomous uplink transmissions to a base station, the configuration information indicating initial resources for an initial uplink transmission slot and retransmission resources for a set of transmission slots subsequent to the initial uplink transmission slot, wherein time resources within slots of the set of transmission slots are configured differently, and the retransmission resources comprise a plurality of sets of time symbols within each slot of the set of transmission slots, and wherein retransmissions in different slots of the set of transmission slots use different sets of time symbols from the plurality of sets of time symbols;
transmit a first autonomous uplink transmission via the initial uplink resources; and
retransmit the first autonomous uplink transmission via at least first retransmission resources in a first slot of the set of transmission slots.

24. The apparatus of claim 23, wherein the instructions are further executable by the processor to cause the apparatus to:
retransmit the first autonomous uplink transmission via second retransmission resources in a second slot of the set of transmission slots, wherein the first retransmission resources and the second retransmission resources occupy different time resources within the respective first slot and second slot.

25. The apparatus of claim 23, wherein the retransmission resources are configured in a first subset of slots that are distributed in a uniform or a non-uniform pattern within the set of transmission slots, and wherein the configuration information indicates which slots of the set of transmission slots have retransmission resources.

26. An apparatus for wireless communications at a base station, comprising: a processor, memory in electronic communication with the processor; and instructions stored in the memory and executable by the processor to cause the apparatus to:
transmit, configuration information to at least a first user equipment (UE) and a second UE to configure the first UE and the second UE for autonomous uplink transmissions, the configuration information indicating initial resources for an initial uplink transmission slot and retransmission resources for a set of transmission slots subsequent to the initial uplink transmission slot, wherein time resources within adjacent slots of the set of transmission slots are configured differently, and the retransmission resources comprise a plurality of sets of time symbols within each slot of the set of transmission slots, and wherein retransmissions of each of the first UE and the second UE in different slots of the set of transmission slots use different sets of time symbols from the plurality of sets of time symbols;
receive a first autonomous uplink transmission from the first UE via the initial uplink resources; and
receive at least a first retransmission of the first autonomous uplink transmission from the first UE via at least first retransmission resources in a first slot of the set of transmission slots.

27. The apparatus of claim 26, wherein the instructions are further executable by the processor to cause the apparatus to:
receive a second retransmission of the first autonomous uplink transmission from the first UE via second retransmission resources in a second slot of the set of transmission slots, wherein the first retransmission resources and the second retransmission resources occupy different time resources within the respective first slot and second slot.

28. The apparatus of claim 26, wherein the retransmission resources are configured in a first subset of slots that are distributed in a uniform or a non-uniform pattern within the set of transmission slots, and wherein the configuration information indicates which slots of the set of transmission slots have retransmission resources.

* * * * *